US012117747B2

(12) United States Patent
Tanemura et al.

(10) Patent No.: US 12,117,747 B2
(45) Date of Patent: Oct. 15, 2024

(54) ENDLESS BELT, TRANSFER DEVICE, AND IMAGE FORMING APPARATUS

(71) Applicant: FUJIFILM Business Innovation Corp., Tokyo (JP)

(72) Inventors: Daisuke Tanemura, Kanagawa (JP); Shigeru Fukuda, Kanagawa (JP); Masato Ono, Kanagawa (JP); Masato Furukawa, Kanagawa (JP); Hiroaki Tanaka, Kanagawa (JP); Yosuke Kubo, Kanagawa (JP); Masayuki Seko, Kanagawa (JP); Koichi Matsumoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 64 days.

(21) Appl. No.: 17/950,352

(22) Filed: Sep. 22, 2022

(65) Prior Publication Data

US 2023/0236528 A1 Jul. 27, 2023

(30) Foreign Application Priority Data

Jan. 24, 2022 (JP) ................................ 2022-008889

(51) Int. Cl.
*G03G 15/16* (2006.01)

(52) U.S. Cl.
CPC .................................. *G03G 15/162* (2013.01)

(58) Field of Classification Search
CPC ........... G03G 15/0189; G03G 15/1605; G03G 15/161; G03G 15/1615; G03G 15/162; G03G 2215/0122–0135
See application file for complete search history.

(56) References Cited

U.S. PATENT DOCUMENTS

| | | | | |
|---|---|---|---|---|
| 10,831,133 | B1 * | 11/2020 | Sugiura | G03G 15/1605 |
| 10,935,908 | B1 * | 3/2021 | Seko | G03G 15/0865 |
| 2011/0033213 | A1 * | 2/2011 | Nakamura | G03G 15/1685 399/313 |
| 2011/0255892 | A1 * | 10/2011 | Aoki | G03G 15/1605 399/66 |
| 2013/0136928 | A1 * | 5/2013 | Yamane | C09D 183/12 428/421 |
| 2014/0374664 | A1 * | 12/2014 | Wu | H01B 1/24 252/500 |
| 2017/0277080 | A1 * | 9/2017 | Daishi | G03G 15/162 |
| 2018/0307148 | A1 * | 10/2018 | Ishida | G03G 5/14704 |
| 2020/0356029 | A1 * | 11/2020 | Takei | G03G 15/162 |
| 2022/0365464 | A1 * | 11/2022 | Kameyama | G03G 15/162 |

FOREIGN PATENT DOCUMENTS

| | | | |
|---|---|---|---|
| JP | 2007-011117 | A | 1/2007 |
| JP | 2007-078789 | A | 3/2007 |
| JP | 2010231023 | A * | 10/2010 |
| JP | 2011197596 | A * | 6/2011 |

OTHER PUBLICATIONS

JP 2011-197596 with machine translation. (Year: 2011).*
Machine Translation of JP 2010-231023. (Year: 2010).*

* cited by examiner

*Primary Examiner* — Carla J Therrien
(74) *Attorney, Agent, or Firm* — Sughrue Mion, PLLC

(57) ABSTRACT

An endless belt includes a layer containing a resin and electrically conductive particles. In the endless belt, a discharge starting voltage at which discharge starts when a voltage is applied to the layer and increased is 0.9 kV or more.

20 Claims, 2 Drawing Sheets

ENDLESS BELT, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2022-008889 filed Jan. 24, 2022.

BACKGROUND

(i) Technical Field

The present disclosure relates to an endless belt, a transfer device, and an image forming apparatus.

(ii) Related Art

In electrophotographic image forming apparatuses (such as copiers, facsimiles, and printers), a toner image formed on a surface of an image holding member is transferred onto a surface of a recording medium and fixed on the recording medium to form an image. To transfer a tone image onto a recording medium, an electrically conductive endless belt such as an intermediate transfer belt is used.

For example, Japanese Unexamined Patent Application Publication No. 2007-011117 discloses "an intermediate transfer belt including at least a surface layer on a substrate, wherein the surface layer contains aggregates of electrically conductive particles having an average particle diameter of 0.5 to 25 μm."

Japanese Unexamined Patent Application Publication No. 2007-078789 discloses "an intermediate transfer belt including at least a surface layer on a substrate, wherein the surface layer contains metal-coated fine resin particles."

SUMMARY

In a transfer device that uses an endless belt as an intermediate transfer body, when a recording medium having large surface irregularities such as embossed paper (hereinafter referred to also as a "non-smooth paper sheet") is used, the intermediate transfer body cannot follow the irregularities of the recording medium when a toner image is transferred from the intermediate transfer body onto the recording medium. In this case, transferability deteriorates, so that white patches may be formed in the image.

Aspects of non-limiting embodiments of the present disclosure relate to an endless belt including a layer containing a resin and electrically conductive particles. When used as an intermediate transfer body, the endless belt exhibits better transferability onto a non-smooth paper sheet than an endless belt in which a discharge starting voltage at which discharge starts when a voltage is applied to the layer and increased is less than 0.9 kV or an endless belt in which the number average primary particle diameter of the electrically conductive particles is more than 11 nm.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an endless belt including a layer containing a resin and electrically conductive particles, wherein a discharge starting voltage at which discharge starts when a voltage is applied to the layer and increased is 0.9 kV or more.

BRIEF DESCRIPTION OF THE DRAWINGS

Exemplary embodiments of the present disclosure will be described in detail based on the following figures, wherein.

DETAILED DESCRIPTION

Figure 1:
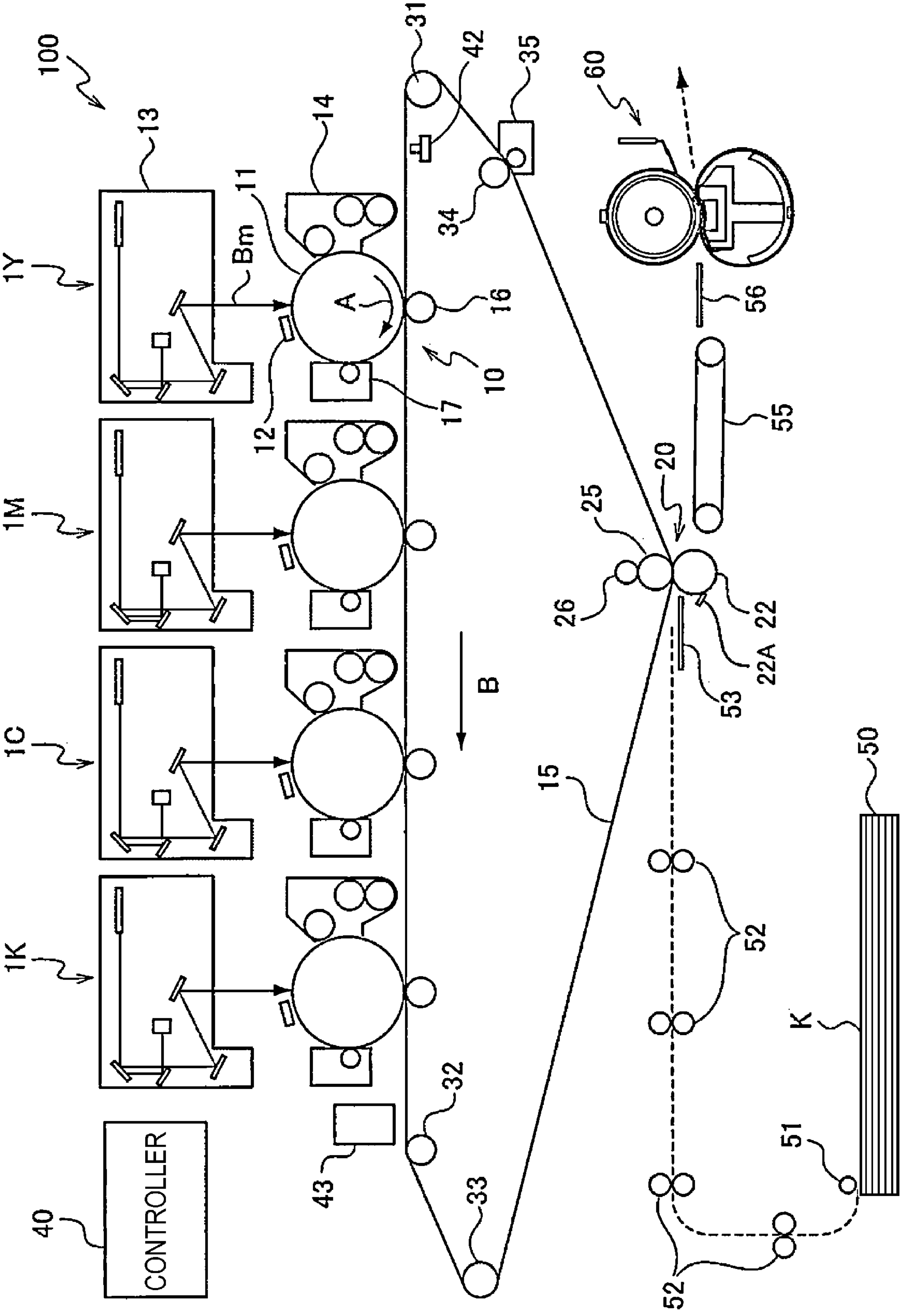
FIG. 1 is a schematic illustration showing an example of an image forming apparatus according to an exemplary embodiment.

Exemplary embodiments of the disclosure will be described below. The following description and Examples are illustrative of the exemplary embodiments and are not intended to limit the scope of the exemplary embodiments.

In a set of numerical ranges expressed in a stepwise manner in an exemplary embodiment, the upper or lower limit in one numerical range may be replaced with the upper or lower limit in another numerical range in the set. Moreover, in a numerical range described in an exemplary embodiment, the upper or lower limit in the numerical range may be replaced with a value indicated in an Example.

In the exemplary embodiments, the term "step" is meant to include not only an independent step but also a step that is not clearly distinguished from other steps, so long as the prescribed purpose of the step can be achieved.

In each exemplary embodiment, when the exemplary embodiment is explained with reference to the drawings, the structure of the exemplary embodiment is not limited to the structure shown in the drawings. In the drawings, the sizes of the components are conceptual, and the relative relations between the components are not limited to the illustrated relations.

In each exemplary embodiment, any component may contain a plurality of materials corresponding to the component. In each exemplary embodiment, when reference is made to the amount of a component in a composition, if the composition contains a plurality of materials corresponding to the component, the amount means the total amount of the plurality of materials, unless otherwise specified.

[Endless Belt]

An endless belt according to a first exemplary embodiment includes a layer containing a resin and electrically conductive particles. In the endless belt, a discharge starting voltage at which discharge starts when a voltage is applied to the layer and increased is 0.9 kV or more.

An endless belt according to a second exemplary embodiment includes a layer containing a resin and electrically conductive particles. In the endless belt, the electrically conductive particles have a number average primary particle diameter of 11 nm or less.

Hereinafter, an embodiment that encompasses both the first exemplary embodiment and the second exemplary embodiment is referred to also as the "present exemplary embodiment."

The endless belt according to the present exemplary embodiment satisfies the above-described characteristics and therefore exhibits good transferability onto a non-smooth paper sheet when used as an intermediate transfer body. The reason for this is not clear but may be as follows.

In an image forming apparatus that uses an endless belt as an intermediate transfer body, when a non-smooth paper sheet is used as a recording medium, the intermediate transfer body may not follow the irregularities of the recording medium when a toner image is transferred from the intermediate transfer body onto the recording medium. In this case, transferability deteriorates, so that white patches may be formed in the image.

In particular, the non-electrostatic adhesion formed between the toner and the outer circumferential surface of the endless belt used as the intermediate transfer body can be strong in some cases. In this case also, the transferability deteriorates when a non-smooth paper sheet is used as a recording medium, so that white patches may be formed in the image. This is because recessed portions of the non-smooth paper sheet do not easily come into contact with the toner image formed on the outer circumferential surface of the intermediate transfer body.

Hereinafter, the "characteristic that a discharge starting voltage at which discharge starts when a voltage is applied to the layer containing the resin and the electrically conductive particles and increased is 0.9 kV or more" is referred to as an "electrostatic adhesion characteristic."

The endless belt according to the first exemplary embodiment satisfies the electrostatic adhesion characteristic. In this case, the electrostatic adhesion of the layer in the endless belt that contains the resin and the electrically conductive particles is low. Then the electrostatic adhesion formed between the outer circumferential surface of the endless belt and a toner is also low. Therefore, even when a non-smooth paper sheet is used as a recording medium, the occurrence of white patches in an image due to a reduction in transferability may be prevented.

In the endless belt according to the second exemplary embodiment, the resin layer contains the electrically conductive particles having a number average primary particle diameter falling within the above range, and the electrically conductive particles having the small number average primary particle diameter are more likely to be highly dispersed in the layer. In this case, the electrostatic adhesion of the layer in the endless belt that contains the resin and the electrically conductive particles is low. Then the electrostatic adhesion formed between the outer circumferential surface of the endless belt and the toner is also low. Therefore, even when a non-smooth paper sheet is used as a recording medium, the occurrence of white patches in an image due to a reduction in transferability may be prevented.

The endless belt according to the present exemplary embodiment will be described in detail.

<Discharge Starting Voltage>

In the endless belt according to the first exemplary embodiment, the discharge starting voltage at which discharge starts when a voltage is applied to the layer containing the resin and the electrically conductive particles and then increased is 0.9 kV or more, preferably from 0.95 kV to 1.5 kV inclusive, and more preferably from 1.0 kV to 1.4 kV inclusive.

In the endless belt according to the second exemplary embodiment, the discharge starting voltage at which discharge starts when a voltage is applied to the layer containing the resin and the electrically conductive particles and then increased is preferably 0.9 kV or more, more preferably from 0.95 kV to 1.5 kV inclusive, and still more preferably from 1.0 kV to 1.4 kV inclusive.

When the discharge starting voltage is 0.9 kV or more, an increase in the electrostatic adhesion of the layer containing the resin and the electrically conductive particles is prevented, so that the electrostatic adhesion formed between the outermost surface of the endless belt and the toner is low. This may be the reason that the transferability onto a non-smooth paper sheet is good.

The discharge starting voltage is measured as follows.

First, a 3 cm×4 cm rectangular piece is cut from the layer in the endless belt of interest that contains the resin and the electrically conductive particles and used as a test piece. Next, in an environment of 22° C. and 15%, the test piece is placed on an electrode, and another electrode is placed with a 60 μm-thick film interposed therebetween to thereby form a spatial gap of 60 μm. Then a voltage is applied and increased at 1.67 V/s, and the applied voltage at which discharge starts is used as the discharge starting voltage.

Hereinafter, the "characteristic that polyester resin particles adhering to the outer circumferential surface are separated from the outer circumferential surface at a blowing pressure P0 of 6 kPa or less" is referred to also as a "non-electrostatic adhesion characteristic."

<Non-Electrostatic Adhesion Characteristic>

In the endless belt according to the present exemplary embodiment, when polyester resin particles having a volume average particle diameter of 4.7 μm are caused to adhere to the outer circumferential surface at a load of 0 g/cm$^2$ and then air is blown onto the outer circumferential surface from its upper side while the blowing pressure of the air is increased, the polyester resin particles adhering to the outer circumferential surface are separated therefrom. The blowing pressure at which all the polyester resin particles adhering to the outer circumferential surface are separated therefrom is preferably 6 kPa or less (more preferably 4 kPa or less and still more preferably 2 kPa or less) from the viewpoint of the transferability onto a non-smooth paper sheet.

When this non-electrostatic adhesion characteristic is satisfied, the non-electrostatic adhesion formed between a toner and the outer circumferential surface of the endless belt is low. In this case, even when a non-smooth paper sheet is used as a recording medium, the occurrence of white patches in an image due to a reduction in transferability is further prevented.

Whether or not the non-electrostatic adhesion characteristic is satisfied is determined as follows.

First, a 3 cm×4 cm rectangular test specimen is cut from the endless belt of interest.

Next, with a voltage of 10 kV applied horizontally to the surface of the specimen that corresponds to the outer circumferential surface of the endless belt in an environment of 22° C. and 15%, the polyester resin particles are sprayed downward onto the surface of the specimen corresponding to the outer circumferential surface of the endless belt from above to cause the polyester resin particles to adhere to the surface at a mass per unit area of 3 g/cm$^2$. The polyester resin particles are sprayed downward so as to free fall by their own weight from above and allowed to adhere to the surface corresponding to the outer circumferential surface of the endless belt at a load of 0 g/cm$^2$.

The polyester resin particles are formed of a polycondensation product of dimethyl fumarate that is a dicarboxylic acid and propylene glycol that is a dialcohol, and the resin particles used have a weight average molecular weight of 25000 and a volume average particle diameter of 4.7 μm.

The polyester resin particles used are resin particles that are not substantially in frictional contact with each other or other members (such as a carrier) and cause substantially no triboelectrification. Specifically, the polyester resin particles used are resin particles that have been stored in an environment of from 10° C. to 22° C. inclusive and from 10% RH to 55% RH inclusive for a half year after the production.

Next, air is blown onto a central portion of the polyester resin particle-adhering surface of the specimen from an air blowing port having a diameter of 0.7 mm and located at a height of 3 cm from the surface of the specimen. The blowing of the air is started using a blowing pressure of 0.1 kPa, and the blowing pressure is increased at 0.5 kPa/second.

When all the polyester resin particles have been separated from the specimen when the blowing pressure reaches 6 kPa, the non-electrostatic adhesion characteristic is determined to be satisfied.

If some polyester resin particles remain on the specimen even after the blowing pressure of the air has exceeded 6 kPa, the non-electrostatic adhesion characteristic is determined not to be satisfied.

The weight average molecular weight of the polyester resin particles is measured by gel permeation chromatography (GPC). In the molecular weight measurement by GPC, a GPC measurement apparatus HLC-8120GPC manufactured by TOSOH Corporation is used. A TSKgel Super HM-M (15 cm) column manufactured by TOSOH Corporation and a THF solvent are used. The weight average molecular weight and the number average molecular weight are computed from the measurement results using a molecular weight calibration curve produced using monodispersed polystyrene standard samples.

The volume average particle diameter of the polyester resin particles is measured using Coulter Multisizer II (manufactured by Beckman Coulter, Inc.), and ISOTON-II (manufactured by Beckman Coulter, Inc.) is used as an electrolyte.

In the measurement, a measurement sample in an amount of from 0.5 mg to 50 mg inclusive is added to 2 mL of a 5% aqueous solution of a surfactant (which may be sodium alkylbenzenesulfonate) serving as a dispersant. The mixture is added to 100 mL to 150 mL of the electrolyte.

The electrolyte with the sample suspended therein is subjected to dispersion treatment for 1 minute using an ultrasonic dispersion apparatus, and then the particle size distribution of particles having diameters within the range of from 2 μm to 60 μm inclusive is measured using an aperture having an aperture diameter of 100 μm in the Coulter Multisizer II. The number of particles sampled is 50000.

The particle size distribution measured and divided into particle size ranges (channels) is used to obtain a volumetric cumulative distribution computed from the small diameter side, and the particle diameter at a cumulative frequency of 50% is defined as the volume average particle diameter D50v.

In the endless belt according to the present exemplary embodiment, the relation represented by formula (P) below may be satisfied. Specifically, the polyester resin particles are caused to adhere to the outer circumferential surfaces of endless belts at a load of 0 g/cm$^2$ and a load of 46 g/cm$^2$. Then air is blown onto the outer circumferential surface of each endless belt from its upper side while the blowing pressure is increased to determine the blowing pressure of the air when all the polyester resin particles adhering to the outer circumferential surface are separated from the outer circumferential surface. Then the relation between the air blowing pressures that is represented by formula (P) is determined.

When the relation represented by formula (P) below (more preferably formula (P2) and still more preferably formula (P3)) is satisfied, the non-electrostatic adhesion formed between the outer circumferential surface of the endless belt and the toner is low enough. In this case, even when a non-smooth paper sheet is used as the recording medium, the occurrence of white patches in an image due to a reduction in transferability is prevented.

$$\text{blowing pressure } P46/\text{blowing pressure } P0 \leq 1.5 \qquad \text{Formula (P):}$$

$$\text{blowing pressure } P46/\text{blowing pressure } P0 \leq 1.45 \qquad \text{Formula (P2):}$$

$$\text{blowing pressure } P46/\text{blowing pressure } P0 \leq\leq 1.40 \qquad \text{Formula (P3):}$$

In formulas (P) to (P3), P0 is the air blowing pressure at which all the polyester resin particles caused to adhere to the outer circumferential surface at a load of 0 g/cm$^2$ are separated from the outer circumferential surface, and P46 is the air blowing pressure at which all the polyester resin particles caused to adhere to the outer circumferential surface at a load of 46 g/cm$^2$ are separated from the outer circumferential surface.

In formulas (P) to (P3), the lower limit of "blowing pressure P46/blowing pressure P0" is ideally 1 and may be, for example, 1.1 or 1.2.

The blowing pressure P0 and the blowing pressure P46 are measured according to a method that determines whether or not the non-electrostatic adhesion characteristic is satisfied.

Specifically, the blowing pressure P0 is determined as the blowing pressure at which all the polyester resin particles are separated from the test piece using the same method as the method that determines whether or not the non-electrostatic adhesion characteristic is satisfied.

The blowing pressure P46 is determined as the blowing pressure at which all the polyester resin particles are separated from the test piece using the same method as the method that determines whether or not the non-electrostatic adhesion characteristic is satisfied except for the following. The polyester resin particles are sprayed downward onto the outer circumferential surface of the endless belt at a blowing pressure of 46 g/cm$^2$ from a height of 10 cm or less measured from the surface corresponding to the outer circumferential surface of the endless belt to thereby allow the polyester resin particles to adhere to the surface corresponding to the outer circumferential surface of the endless belt at a load of 46 g/cm$^2$.

<Surface Free Energy>

From the viewpoint of improving the transferability onto a non-smooth paper sheet, the surface free energy of the outer circumferential surface of the endless belt according to the present exemplary embodiment is preferably 47 mN/m or less, more preferably 40 mN/m or less, and still more preferably 35 mN/m or less. From the viewpoint of the cleanability of the belt, the lower limit of the surface free energy is, for example, 10 mN/m or more.

The surface free energy is measured using a contact angle meter CAM-200 (manufactured by KSV) and computed using a program that uses a Zisman method and is installed in the device.

<Water Contact Angle>

From the viewpoint of improving the transferability onto a non-smooth paper sheet, the water contact angle of the outer circumferential surface of the endless belt according to the present exemplary embodiment is preferably 85° or more, more preferably 90° or more, and still more preferably 95° or more. From the viewpoint of cleanability of the belt, the lower limit of the water contact angle is, for example, 110° or less.

The water contact angle is an indicator indicating water repellency and is measured as follows.

A contact angle meter (type: CA-X-FACE manufactured by Kyowa Interface Science Co., Ltd.) is used. In an environment at a temperature of 25° C. and a humidity of 50%, 3 μl of pure water is dropped onto the surface of a measurement target, and an image of the liquid droplet is taken 3 seconds after the dropping under an optical microscope. The water contact angle θ in the image obtained is determined using a θ/2 method.

<Diiodomethane Contact Angle>

From the viewpoint of improving the transferability onto a non-smooth paper sheet, the diiodomethane contact angle of the outer circumferential surface of the endless belt according to the present exemplary embodiment is preferably 40° or more, more preferably 45° or more, and still more preferably 50° or more. From the viewpoint of the cleanability of the belt, the lower limit of the diiodomethane contact angle is, for example, 80° or less.

The diiodomethane contact angle is an indicator indicating oil repellency and is measured as follows.

The contact angle meter (type: CA-X-FACE manufactured by Kyowa Interface Science Co., Ltd.) is used. In an environment at a temperature of 25° C. and a humidity of 50%, 3 μl of diiodomethane (purity=99%) is dropped onto the surface of a measurement target, and an image of the liquid droplet is taken 3 seconds after the dropping under an optical microscope. The diiodomethane contact angle θ in the image obtained is determined using a θ/2 method.

<Layer Structure>

The endless belt according to the present exemplary embodiment contains a resin (hereinafter may be referred to as a "first resin") and electrically conductive particles (hereinafter may be referred to as "first electrically conductive particles") and may further contain a surfactant.

The endless belt may be a single-layer belt or a layered belt. Specifically, the endless belt is a single-layer belt composed of a layer containing the first resin and the first electrically conductive particles or a layered belt including the above layer as a surface layer forming the outer circumferential surface of the endless belt.

When the endless belt is a single-layer belt, the single-layer belt is the layer containing the first resin and the first electrically conductive particles and optionally containing the surfactant.

When the endless belt is a layered belt, the layered belt includes, for example, a base layer and a surface layer disposed on the base layer. The surface layer is the outermost layer of the endless belt. The layered belt may include an additional surface layer between the base layer and the surface layer.

When the endless belt is a layered belt including a base layer and a surface layer, the surface layer is a layer containing the first resin and the first electrically conductive particles. The surface layer may contain the surfactant. No particular limitation is imposed on the base layer, and examples thereof include a layer containing a second resin and second electrically conductive particles.

In the endless belt according to the first exemplary embodiment, it is only necessary that the discharge starting voltage at which discharge starts when a voltage is applied to the surface layer of the layered belt or the single-layer belt and increased be 0.9 kV or less, and it is unnecessary that other layers (such as the layer in the layered belt that contains the second resin and the second electrically conductive particles) satisfy the electrostatic characteristic.

In the endless belt according to the second exemplary embodiment, it is only necessary that the number average primary particle diameter of the first electrically conductive particles be 11 nm or less, and it is unnecessary that the number average primary particle diameter of the second electrically conductive particles be within the above range.

The layer in a single-layer endless belt is hereinafter referred to also as a "single layer."

In a layered endless belt, the surface layer containing the first resin and the first electrically conductive particles is referred to also as a "first layer," and the base layer containing the second resin and the second electrically conductive particles is referred to also as a "second layer."

<Resins>

Examples of the first resin contained in the single layer or the first layer include polyimide resins (PI resins), polyamide-imide resins (PAI resins), aromatic polyether ketone resins (such as aromatic polyether ether ketone resins), polyphenylene sulfide resins (PPS resins), polyetherimide resins (PEI resins), polyester resins, polyamide resins, and polycarbonate resins. Preferably, the first resin includes at least one selected from the group consisting of polyimide resins, polyamide-imide resins, aromatic polyether ether ketone resins, polyetherimide resins, and polyphenylene sulfide resins, from the viewpoint of mechanical strength and the dispersibility of the first electrically conductive particles. More preferably, the first resin includes at least one selected from the group consisting of polyimide resins and polyamide-imide resins.

In particular, from the viewpoint of mechanical strength, polyimide resins are still more preferable. The first resin may be composed of one resin or may be a mixture of two or more resins.

Specific examples and preferred examples of the second resin contained in the second layer are the same as the specific examples and the preferred examples of the first resin. The second resin may be composed of one resin or may be a mixture of two or more resins.

When the endless belt includes the first layer and the second layer, the first resin and the second resin may be the same resin or different resins and are preferably the same resin (for example, the first resin and the second resin are both a polyimide resin).

(Polyimide Resins)

Examples of the polyimide resins include imidized products of polyamic acids (precursors of polyimide resins) that are polymers of tetracarboxylic dianhydrides and diamine compounds.

Examples of the polyimide resins include resins having a structural unit represented by the following general formula (I).

General formula (I)

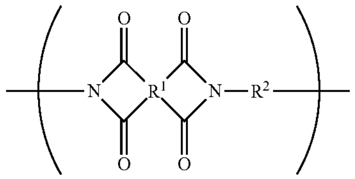

In general formula (I), $R^1$ represents a tetravalent organic group, and $R^2$ represents a divalent organic group.

Examples of the tetravalent organic group represented by $R^1$ include aromatic groups, aliphatic groups, alicyclic groups, combinations of aromatic and aliphatic groups, and substituted groups thereof. Specific examples of the tetravalent organic group include residues of tetracarboxylic dianhydrides described later.

Examples of the divalent organic group represented by $R^2$ include aromatic groups, aliphatic groups, alicyclic groups, combinations of aromatic and aliphatic groups, and substituted groups thereof. Specific examples of the divalent organic group include residues of diamine compounds described later.

Specific examples of the tetracarboxylic dianhydride used as a raw material of the polyimide resin include pyromellitic dianhydride, 3,3',4,4'-benzophenonetetracarboxylic dianhydride, 3,3',4,4'-biphenyltetracarboxylic dianhydride, 2,3,3',4-biphenyltetracarboxylic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 2,2'-bis(3,4-dicarboxyphenyl)sulfonic dianhydride, perylene-3,4,9,10-tetracarboxylic dianhydride, bis(3,4-dicarboxyphenyl)ether dianhydride, and ethylenetetracarboxylic dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenylsulfone, 1,5-diaminonaphthalene, m-phenylenediamine, p-phenylenediamine, 3,3'-dimethyl-4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino-tert-butyl)toluene, bis(p-β-amino-tert-butylphenyl)ether, bis(p-β-methyl-δ-aminophenyl)benzene, bis-p-(1,1-dimethyl-5-amino-pentyl)benzene, 1-isopropyl-2,4-m-phenylenediamine, m-xylylenediamine, p-xylylenediamine, di(p-aminocyclohexyl)methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, and $H_2N(CH_2)_3N(CH_3)_2(CH_2)_3NH_2$.

(Polyamide-Imide Resin)

Examples of the polyamide-imide resin include resins having a repeating unit including an imide bond and an amide bond.

More specific examples of the polyamide-imide resin include a polymer of a trivalent carboxylic acid compound (referred to also as a tricarboxylic acid) having an acid anhydride group with a diisocyanate compound or a diamine compound.

The tricarboxylic acid may be trimellitic anhydride or a derivative thereof. The tricarboxylic acid may be used in combination with a tetracarboxylic dianhydride, an aliphatic dicarboxylic acid, an aromatic dicarboxylic acid, etc.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include compounds that have structures similar to the structures of the above isocyanates and have amino groups instead of the isocyanato groups.

(Aromatic Polyether Ketone Resin)

Examples of the aromatic polyether ketone resin include a resin in which aromatic rings such as benzene rings are linearly bonded through ether and ketone bonds.

Examples of the aromatic polyether ketone resin include polyether ketones (PEK) in which ether bonds and ketone bonds are alternately arranged, polyether ether ketones (PEEK) including a repeating unit including an ether bond, another ether bond, and a ketone bond arranged in this order, polyether ketone ketones (PEKK) including a repeating unit including an ether bond, a ketone bond, and another ketone bond arranged in this order, polyether ether ketone (PEEKK) including a repeating unit including an ether bond, another ether bond, a ketone bond, and another ketone bond arranged in this order, and polyether ketone esters including an ester bond.

From the viewpoint of controlling strength, volume resistivity, etc., the content of the first resin with respect to the total mass of the single layer is preferably from 60% by mass to 95% by mass inclusive, more preferably from 70% by mass to 95% by mass inclusive, and still more preferably from 75% by mass to 90% by mass inclusive.

From the viewpoint of controlling strength, volume resistivity, etc., the content of the first resin with respect to the total mass of the first layer is preferably from 60% by mass to 95% by mass inclusive, more preferably from 70% by mass to 95% by mass inclusive, and still more preferably from 75% by mass to 90% by mass inclusive.

From the viewpoint of controlling strength, volume resistivity, etc., the content of the second resin with respect to the total mass of the second layer is preferably from 60% by mass to 95% by mass inclusive, more preferably from 70% by mass to 95% by mass inclusive, and still more preferably from 75% by mass to 90% by mass inclusive.

<Electrically Conductive Particles>

The first electrically conductive particles contained in the single layer or the first layer are, for example, at least one type of particles selected from the group consisting of electrically conductive carbon particles and metal oxide particles.

In particular, the first electrically conductive particles may include electrically conductive carbon particles.

When the first electrically conductive particles include electrically conductive carbon particles, the endless belt to be obtained has a better non-electrostatic adhesion characteristic and may have better transferability onto a non-smooth paper sheet.

The electrically conductive carbon particles are, for example, carbon black particles.

Examples of the carbon black include Ketjen black, oil furnace black, channel black, and acetylene black. The carbon black used may be carbon black with a treated surface (referred to also as "surface-treated carbon black").

The surface-treated carbon black is obtained by adding, for example, carboxy groups, quinone groups, lactone groups, or hydroxy groups to its surface. Examples of the surface treatment method include an air oxidation method in which carbon black is brought into contact with air in a high-temperature atmosphere to react therewith, a method in which carbon black is allowed to react with nitrogen oxide or ozone at room temperature (e.g., 22° C.), and a method in which carbon black is oxidized with air in a high-temperature atmosphere and oxidized with ozone at low temperature.

Examples of the metal oxide particles include tin oxide particles, titanium oxide particles, zinc oxide particles, and zirconium oxide particles.

Other examples of the first electrically conductive particles include metal particles (such as aluminum particles and nickel particles) and ionic conductive particles (such as potassium titanate particles and LiCl particles).

In the first exemplary embodiment, the number average primary particle diameter of the first electrically conductive particles is preferably 11 nm or less, more preferably from 6 nm to 10 nm inclusive, and still more preferably from 8 nm to 10 nm inclusive, from the viewpoint of the transferability onto a non-smooth paper sheet.

In the second exemplary embodiment, the number average primary particle diameter of the first electrically conductive particles is 11 nm or less. From the viewpoint of the transferability onto a non-smooth paper sheet, the number average primary particle diameter is preferably from 6 nm to 10 nm inclusive and more preferably from 8 nm to 10 nm inclusive.

When the number average primary particle diameter of the electrically conductive particles is 11 nm or less, the electrostatic adhesion of the surface layer is low. Therefore, the electrostatic adhesion formed between the outer circumferential surface of the endless belt and the toner is also low, so that good transferability onto a non-smooth paper sheet may be obtained.

The number average primary particle diameter of the second electrically conductive particles is, for example, in the range of from 2 nm to 40 nm inclusive. From the viewpoint of dispersibility, mechanical strength, volume resistivity, film formability, etc., the number average primary particle diameter is preferably in the range of from 20 nm to 40 nm inclusive, more preferably in the range of from 20 nm to 35 nm inclusive, and still more preferably in the range of from 20 nm to 28 nm inclusive.

When the endless belt includes the first layer and the second layer, the number average primary particle diameter of the first electrically conductive particles may be smaller than the number average primary particle diameter of the second electrically conductive particles. The number average primary particle diameter of the first electrically conductive particles is preferably equal to or more than 0.3 times and less than 0.9 times the number average primary particle diameter of the second electrically conductive particles, more preferably from 0.3 times to 0.7 times inclusive, and still more preferably from 0.3 times to 0.5 times inclusive. When the relation between the number average primary particle diameter of the first electrically conductive particles and the number average primary particle diameter of the second electrically conductive particles is within the above range, better transferability onto a non-smooth paper sheet may be obtained, and also the occurrence of image defects (such as color loss) may be further prevented.

The number average primary particle diameter of the electrically conductive particles is measured by the following method.

First, a measurement sample with a thickness of 100 nm is taken from each layer of the obtained belt using a microtome. The measurement sample is observed under a TEM (transmission electron microscope). The diameters of circles having areas equal to the projected areas of 50 electrically conductive particles (i.e., their equivalent circle diameters) are used as their particle diameters, and their average value is used as the number average primary particle diameter.

When the first resin includes at least one selected from the group consisting of polyimide resins and polyamide-imide resins and the single layer or the first layer is formed using a first coating solution described later, the first electrically conductive particles may be electrically conductive carbon particles in order to obtain better transferability onto a non-smooth paper sheet.

The first electrically conductive particles may be one type of particles or may be a mixture of two or more types of particles.

Specific examples of the second electrically conductive particles contained in the second layer are the same as the specific examples of the first electrically conductive particles.

The content of the second electrically conductive particles with respect to the total mass of the second layer is preferably from 5% by mass to 40% by mass inclusive, more preferably from 10% by mass to 30% by mass inclusive, and still more preferably from 20% by mass to 30% by mass inclusive, from the viewpoint of dispersibility, mechanical strength, and adjustment of volume resistivity.

The content of the electrically conductive particles in the layer containing the resin and the electrically conductive particles with respect to the total mass of solids in the layer is preferably from 10% by mass to 30% by mass inclusive, more preferably from 15% by mass to 25% by mass inclusive, and still more preferably from 18% by mass to 23% by mass inclusive. When the content of the electrically conductive particles in the layer is within the above range, the electrically conductive particles are more likely to be highly dispersed in the layer, so that the electrostatic adhesion of the layer tends to be low.

Therefore, the electrostatic adhesion formed between the outer circumferential surface of the endless belt and the toner is also low, and good transferability onto a non-smooth paper sheet may be obtained.

<Surfactant>

The layer containing the resin and the electrically conductive particles may further contain a surfactant.

When the layer further contains the surfactant, the electrically conductive particles having a small number average primary particle diameter and the surfactant that reduces the surface free energy are more likely to be highly dispersed in the layer. In this case, the non-electrostatic adhesion formed between the outer circumferential surface of the endless belt and the toner is reduced. Therefore, even when a non-smooth paper sheet is used as the recording medium, the occurrence of white patches in an image due to a reduction in transferability may be further prevented.

Examples of the surfactant include surfactants having at least one structure selected from perfluoroalkyl structures, alkylene oxide structures, and silicone structures. When a surfactant having any of the above structures is used, the non-electrostatic adhesion characteristic, the surface free energy, the water contact angle, and the diiodomethane contact angle are satisfied, and the transferability onto a non-smooth paper sheet tends to be improved.

Examples of the surfactant having a perfluoroalkyl structure include perfluoroalkyl sulfonic acids (such as perfluorobutane sulfonic acid and perfluorooctane sulfonic acid), perfluoroalkyl carboxylic acids (such as perfluorobutane carboxylic acid and perfluorooctane carboxylic acid), and perfluoroalkyl group-containing phosphates. The perfluoroalkyl sulfonic acids and the perfluoroalkyl carboxylic acids may be their salts and amide-modified products thereof.

Examples of commercial products of the surfactant having a perfluoroalkyl structure include the MEGAFACE® series (manufactured by DIC Corporation), the F-top series (manufactured by JEMCO), the FTERGENT series (manufactured by NEOS Company Limited), the SURFLON® series (manufactured by AGC SEIMI CHEMICAL Co., Ltd.), the PF series (manufactured by KITAMURA CHEMICALS CO., LTD.), and the FC series (manufactured by 3M).

Examples of the surfactant having an alkylene oxide structure include polyethylene glycol, polyether antifoaming agents, and polyether-modified silicone oils.

The number average molecular weight of the polyethylene glycol may be 2000 or less. Examples of the polyethylene glycol having a number average molecular weight of 2000 or less include polyethylene glycol 2000 (number average molecular weight: 2000), polyethylene glycol 600 (number average molecular weight: 600), polyethylene glycol 400 (number average molecular weight: 400), and polyethylene glycol 200 (number average molecular weight: 200).

Examples of the polyether antifoaming agent include the PE series (manufactured by FUJIFILM Wako Pure Chemical Corporation), and the antifoaming agent series (manufactured by Kao Corporation).

Examples of the polyether-modified silicone oil include silicone oils in which at least one of the side chains and terminal ends of the polysiloxane chain is modified by polyalkylene oxide.

Examples of the surfactant having a silicone structure include general silicone oils such as dimethyl silicone, methylphenyl silicone, diphenyl silicone, and derivatives thereof.

Specific examples of the surfactant having a silicone structure include: the KF series including KF351(A), KF352(A), KF353(A), KF354(A), KF355(A), KF615(A), KF618, KF945(A), KF6004, KP126, and KP109 (manufactured by Shin-Etsu Chemical Co., Ltd.); the TSF series (manufactured by GE Toshiba Silicones Co., Ltd.); the BYK series, the UV series, etc. (manufactured by BYK-Chemie Japan); and the OGSOL series (manufactured by Osaka Gas Chemicals Co., Ltd.).

In particular, the surfactant may be at least one selected from an oligomer having a perfluoroalkyl structure having 6 or less carbon atoms and an oligomer having a silicone structure having a methyl group.

When any of these surfactants is used, the non-electrostatic adhesion characteristic, the surface free energy, the water contact angle, and the diiodomethane contact angle are satisfied, and the transferability onto a non-smooth paper sheet tends to be improved.

The oligomer having a perfluoroalkyl structure having 6 or less carbon atoms may be an oligomer having a substituent having 6 or less carbon atoms (preferably 2 to 6 carbon atoms) and a fluorine atom. From the viewpoint of satisfying the non-electrostatic adhesion characteristic, the surface free energy, the water contact angle, and the diiodomethane contact angle and improving the transferability onto a non-smooth paper sheet, an oligomer having a perfluoroalkyl structure having 6 or less carbon atoms (preferably 2 to 6 carbon atoms) may be used.

The oligomer having a silicone structure having a methyl group may be an oligomer having at least one silicone structure selected from a "$—SiH(CH_3)—O—$" structure, a "$—Si(CH_3)_2—O—$" structure, and a "$—Si(CH_3)(Ph)-O—$" structure (Ph in this structural formula represents a phenyl group), from the viewpoint of satisfying the non-electrostatic adhesion characteristic, the surface free energy, the water contact angle, and the diiodomethane contact angle and improving the transferability onto a non-smooth paper sheet.

The surfactant may be an oligomer having a silane structure having a methyl group. Specifically, the oligomer having a silane structure having a methyl group may be an oligomer having at least one selected from a $—[SiH(CH_3)]_n—$ structure, a $—[Si(CH_3)_2]_n—$ structure, and a $—[Si(CH_3)(Ph)]_n—$ structure (in this structural formula, Ph represents a phenyl group, and n represents an integer of 2 or more).

From the viewpoint of satisfying the non-electrostatic adhesion characteristic, the surface free energy, the water contact angle, and the diiodomethane contact angle and improving the transferability onto a non-smooth paper sheet, these oligomers may be polymerized products including four or more monomers bonded together. Specifically, the number of repeating monomer units in each oligomer may be 4 or more.

Each oligomer may be a polymerized product including from 4 to 1000 (or from 4 to 300) monomer units bonded together. Specifically, the number of repeating monomer units in the oligomer may be from 4 to 1000 inclusive (or from 4 to 300 inclusive).

In the oligomer having a perfluoroalkyl structure having 6 or less carbon atoms, the monomer in the oligomer is a monomer having a perfluoroalkyl structure (such as a (meth) acrylate). In the oligomer having a silicone structure having a methyl group, the monomer in the oligomer is a siloxane having a methyl group.

The content of the surfactant is adjusted such that the non-electrostatic adhesion characteristic, the surface free energy, the water contact angle, and the diiodomethane contact angle are satisfied.

The content of the surfactant with respect to the mass of a layer containing the surfactant is preferably from 0.5% by mass to 10% by mass inclusive, more preferably from 0.7% by mass to 7% by mass inclusive, and still more preferably from 1.0% by mass to 5% by mass inclusive.

When the layer containing the resin and the electrically conductive particles further contains the surfactant, the content of the surfactant with respect to the total mass of solids in the layer is preferably from 1% by mass to 6% by mass inclusive, more preferably from 1.5% by mass to 5% by mass inclusive, and still more preferably from 2% by mass to 4% by mass inclusive. When the content of the surfactant is in the above range, the electrostatic adhesion characteristic is better, and therefore the transferability onto a non-smooth paper sheet may be further improved.

<Additional Components>

Each of the single layer, the first layer, and the second layer may contain additional components other than the resin and the electrically conductive particles.

Examples of the additional components include a conducting material other than the electrically conductive particles, a filler for increasing the strength of the belt, an antioxidant for preventing thermal degradation of the belt, a surfactant for improving flowability, and a heat resistant antioxidant.

When one of the above layers contains any of the additional components, the content thereof with respect to the total mass of the layer is preferably more than 0% by mass and 10% by mass or less, more preferably more than 0% by mass and 5% by mass or less, and still more preferably more than 0% by mass and 1% by mass or less.

<Properties of Endless Belt>

(Thickness of Endless Belt)

The thickness of the single layer is preferably from 60 μm and 120 μm inclusive and more preferably 80 μm and 120 μm inclusive, from the viewpoint of the mechanical strength of the belt.

The thickness of the first layer is preferably from 1 μm to 60 μm inclusive and more preferably from 3 μm to 60 μm inclusive, from the viewpoint of production suitability and from the viewpoint of preventing discharge.

The thickness of the second layer is preferably from 10 μm to 80 μm inclusive and more preferably from 20 μm to 40 μm inclusive, from the viewpoint of the mechanical strength of the belt.

When the endless belt includes the first layer and the second layer, the ratio of the thickness of the first layer to the total thickness of the belt is preferably from 3% to 90% inclusive and more preferably from 5% to 80% inclusive, from the viewpoint of the transferability onto a non-smooth paper sheet.

The thickness of each layer is measured as follows.

Specifically, a cross section of the endless belt in its thickness direction is observed under an optical microscope or a scanning electron microscope. The thickness of the layer of interest is measured at 10 points, and the average value is used as the thickness.

(Potential Decay Rate of Endless Belt)

A potential decay rate dV/dt (hereinafter referred to simply as a "potential decay rate") after the outer circumferential surface of the endless belt is charged to +500 V is preferably from 2.0 V/msec to 6.0 V/msec inclusive, more preferably from 2.3 V/msec to 5.2 V/msec inclusive, and still more preferably from 2.3 V/msec to 3.8 V/msec inclusive, from the viewpoint of the transferability onto a non-smooth paper sheet.

Although the reason that the transferability onto a non-smooth paper sheet is improved when the potential decay rate of the endless belt is from 2.0 V/msec to 6.0 V/msec inclusive is unclear, the reason may be as follows.

When the endless belt is used as an intermediate transfer body of a transfer device, a transfer electric field is applied to the intermediate transfer body from its inner circumferential surface side in a region in which a toner image is transferred from the intermediate transfer body onto a recording medium (this region may be hereinafter referred to also as a "second transfer region"). When the intermediate transfer body passes through the second transfer region, the transfer electric field causes electric charges to be generated on the inner circumferential surface of the intermediate transfer body, and the electric charges generated move through the intermediate transfer body and reach the outer circumferential surface of the intermediate transfer body.

In a high-speed image forming apparatus in which the conveyance speed of a recording medium passing through the second transfer region is 300 mm/s or higher, abnormal discharge tends to occur when a large amount of electric charges reach the outer circumferential surface of the intermediate transfer body during passage of the intermediate transfer body through the second transfer region. If the amount of electric charges reaching the outer circumferential surface of the intermediate transfer body during passage of the intermediate transfer body through the second transfer region is excessively small, electric charges flow from the toner into the intermediate transfer body, and this causes a reduction in the charge amount of the toner, so that the image is not easily transferred in some cases.

However, when the potential decay rate of the endless belt is from 2.0 V/msec to 6.0 V/msec inclusive, the amount of electric charges reaching the outer circumferential surface of the intermediate transfer body during passage of the intermediate transfer body through the second transfer region is appropriate even when the endless belt is used as the intermediate transfer body of the transfer device of the high speed apparatus. Moreover, since the conductive points are finely distributed on the outer circumferential surface of the intermediate transfer body, abnormal discharge and a reduction in the charge amount of the toner are prevented, and this may improve the transferability.

The potential decay rate of the endless belt is determined as follows. A belt piece of 50 mm×60 mm is applied to an insulating plate, and a surface potential meter (for example, Model 314 manufactured by TREK JAPAN) is placed on the surface of the belt (i.e., its outer circumferential surface). The belt piece is charged to 500 V using a scorotron having an opening width of 18 mm with the grid voltage set to 580 V. The surface potential of the belt immediately after charging is measured, and the surface potential during decay is measured every 10 msec. The potential decay rate is computed from the measurement results.

No particular limitation is imposed on the method for controlling the potential decay rate of the endless belt. Examples of the method include: a method in which the number average primary particle diameter of the electrically conductive particles used and the type thereof are appropriately selected; and a method in which conditions in a production process of the endless belt (such as drying conditions) are controlled. In particular, when the endless belt is a layered belt, the potential decay rate can be controlled by adjusting the drying conditions of the surface layer, the drying conditions of the base layer, or a combination of the drying conditions of the surface layer and the drying conditions of the base layer.

The conveyance speed of a recording medium in an image forming apparatus that uses the endless belt having a potential decay rate of from 2.0 V/msec to 6.0 V/msec inclusive (i.e., the conveyance speed of the recording medium passing through the second transfer region) is preferably from 50 mm/s to 600 mm/s inclusive, more preferably from 100 mm/s to 600 mm/s inclusive, and still more preferably from 300 mm/s to 600 mm/s inclusive.

(Volume Resistivity of Endless Belt)

The common logarithm of the volume resistivity of the endless belt when a voltage of 500 V is applied to the endless belt for 10 seconds is preferably from 9.0 (log Ω·cm) to 13.5 (log Ω·cm) inclusive, more preferably from 9.5 (log Ω·cm) to 13.2 (log Ω·cm) inclusive, and particularly preferably from 10.0 (log Ω·cm) to 12.5 (log Ω·cm) inclusive, from the viewpoint of the transferability onto a non-smooth paper sheet.

The volume resistivity of the endless belt when a voltage of 500 V is applied to the endless belt for 10 seconds is measured by the following method.

A microcurrent meter (R8430A manufactured by Advantest) is used as a resistance measurement device, and the probe used is a UR probe (manufactured by Mitsubishi Chemical Analytech Co., Ltd.). The volume resistivity (log Ω·cm) of the endless belt is measured using a voltage of 500 V, an application time of 10 seconds, and a load of 1 kgf at a total of 18 points, i.e., 6 points spaced circumferentially at regular intervals in each of 3 portions including a widthwise central portion and opposite widthwise edge portions, and then the average value is computed. The measurement is performed in an environment at a temperature of 22° C. and a humidity of 55% RH.

(Surface Resistivity of Endless Belt)

The common logarithm of the surface resistivity of the endless belt when a voltage of 500 V is applied to the outer circumferential surface of the endless belt for 10 seconds is preferably from 10.0 (log Ω/sq.) to 15.0 (log Ω/sq.) inclusive, more preferably from 10.5 (log Ω/sq.) to 14.0 (log Ω/sq.) inclusive, and particularly preferably from 11.0 (log Ω/sq.) to 13.5 (log Ω/sq.) inclusive, from the viewpoint of the transferability onto a non-smooth paper sheet.

The unit "log Ω/sq." of the surface resistivity is the logarithm of the resistance value per unit area and is denoted also by log Ω/square, log Ω/□, etc.

The surface resistivity of the endless belt when a voltage of 500 V is applied to the outer circumferential surface of the endless belt for 10 seconds is measured by the following method.

A microcurrent meter (R8430A manufactured by Advantest) is used as a resistance measurement device, and the probe used is a UR probe (manufactured by Mitsubishi Chemical Analytech Co., Ltd.). The surface resistivity (log Ω/sq.) of the outer circumferential surface of the endless belt is measured using a voltage of 500 V, an application time of 10 seconds, and a load of 1 kgf at a total of 18 points, i.e., 6 points spaced circumferentially at regular intervals in each of 3 portions including a widthwise central portion and opposite widthwise edge portions, and then the average value is computed. The measurement is performed in an environment at a temperature of 22° C. and a humidity of 55% RH.

<Method for Producing Endless Belt>

No particular limitation is imposed on the method for producing the endless belt according to the present exemplary embodiment.

An example of the method for producing the endless belt includes: a first coating solution preparing step of preparing the first coating solution containing the first resin or its precursor, the first electrically conductive particles, and a first solvent; a first coating film forming step of forming a first coating film by applying the first coating solution to the outer circumference surface of a substrate to be coated; and a first drying step of drying the first coating film while the temperature of the coated substrate is increased. The method for producing the endless belt may further include an additional step in addition to the first coating solution preparing step, the first coating film forming step, and the first drying step. Examples of the additional step when, for example, a precursor of the first resin is used include a first firing step of firing the first coating film dried in the first drying step.

When a single-layer endless belt is produced, the first coating solution preparing step, the first coating film forming step, and the first drying step are performed, and the single layer containing the first resin and the first electrically conductive particles is thereby formed on the outer circumferential surface of the substrate. The single layer may be formed, for example, by preparing pellets containing the first resin and the first electrically conductive particles and subjecting the pellets to melt extrusion.

When a layered endless belt is produced, the first coating solution preparing step, the first coating film forming step, and the first drying step, for example, are performed, and the first layer containing the first resin and the first electrically conductive particles is thereby formed on the outer circumferential surface of the second layer formed on a substrate.

When the layered endless belt is produced, the second layer is formed on the outer circumferential surface of the substrate through, for example; a second coating solution preparing step of preparing a second coating solution containing the second resin or a precursor thereof, the second electrically conductive particles, and a second solvent; a second coating film forming step of forming a second coating film by applying the second coating solution to the outer circumferential surface of the substrate; and a second drying step of drying the second coating film. The second layer may be formed, for example, by preparing pellets containing the second resin and the second electrically conductive particles and subjecting the pellets to melt extrusion.

(Coating Solution Preparing Steps)

In the first coating solution preparing step, the first coating solution containing the first resin or a precursor thereof, the first electrically conductive particles, and the first solvent is prepared. For example, when the first resin is a polyimide resin and the first electrically conductive particles are carbon black particles, the first coating solution prepared is, for example, a solution that contains the carbon black particles dispersed in the first solvent and a polyamic acid used as the precursor of the polyimide resin and dissolved in the first solvent. Alternatively, for example, when the first resin is a polyamide-imide resin and the first electrically conductive particles are carbon black particles, the first coating solution prepared is, for example, a solution that contains the carbon black particles dispersed in the first solvent and the polyamide-imide resin dissolved in the first solvent.

In a method for preparing the first coating solution, dispersion treatment may be performed using a mill such as a ball mill or a jet mill, from the viewpoint of pulverizing aggregates of the first electrically conductive particles and from the viewpoint of increasing the dispersibility of the first electrically conductive particles.

No particular limitation is imposed on the first solvent, and the first solvent may be appropriately selected according to, for example, the type of resin used as the first resin. For example, when the first resin is a polyimide resin or a polyamide-imide resin, the first solvent used may be a polar solvent.

Examples of the polar solvent include N-methyl-2-pyrrolidone (NMP), N,N-dimethylformamide (DMF), N,N-dimethylacetamide (DMAc), N,N-diethylacetamide (DEAc), dimethyl sulfoxide (DMSO), hexamethylenephosphoramide (HMPA), N-methylcaprolactam, N-acetyl-2-pyrrolidone, and 1,3-dimethyl-2-imidazolidinone (N,N-dimethylimidazolidinone, DMI), and any of them may be used alone or in combination of two or more.

When the second coating solution preparing step is performed, the second coating solution containing the second resin, the second electrically conductive particles, and the second solvent is prepared in the second coating solution preparing step. The second resin and the second electrically conductive particles are as described above, and a method for preparing the second coating solution and the second solvent are the same as the method for preparing the first coating solution and the first solvent, respectively.

(Coating Film Forming Steps)

In the first coating film forming step, the first coating solution is applied to the outer circumferential surface of a substrate to be coated to form the first coating film.

Examples of the substrate to be coated include hollow cylindrical molds and solid cylindrical molds. The substrate to be coated may be prepared by subjecting the outer circumferential surface of any of the above molds to release agent treatment. When a single-layer endless belt is produced, the first coating solution is directly applied to, for example, the outer circumferential surface of the substrate to be coated or the substrate treated with the release agent in the first coating film forming step. When a layered endless belt is produced, the first coating solution is applied to, for example, the outer circumferential surface of a substrate having the second layer or the second coating film formed thereon in the first coating film forming step.

Examples of the method for applying the first coating solution include known methods such as a spray coating method, a spiral coating (flow coating) method, a blade coating method, a wire bar coating method, a dip coating method, a bead coating method, an air knife coating method, and a curtain coating method.

When the second coating film forming step is performed, the second coating solution is applied to the outer circumferential surface of a substrate to be coated in the second coating film forming step to form the second coating film. The method for applying the second coating solution is the same as the method for applying the first coating solution.

(Drying Steps)

In the first drying step, the first coating film formed in the first coating film forming step is dried. In the first drying step, the first solvent contained in the first coating film is removed, and the single layer or the first layer is thereby obtained.

Examples of the method for drying the first coating film include a method in which hot air is supplied to the first coating film and a method in which the coated substrate is heated.

In the first drying step, an average integral heating rate A/B (° C./min) may be 5.74° C./min or higher. Here, A° C. is the average integral value of the temperature of the coated substrate in the drying step, and B min is the time from when the drying is started to when the temperature of the coated substrate reaches the average integral value A° C. When the average integral heating rate A/B (° C./min) is 5.74° C./min or higher, the endless belt obtained may have good transferability onto a non-smooth paper sheet when used as an intermediate transfer body. Although the reason for this is unclear, the reason may be as follows.

Specifically, when the average integral heating rate A/B is high, the first coating film dries fast. In this case, the first electrically conductive particles are fixed in the first coating film before aggregation of the first electrically conductive particles occurs, so that, in the layer obtained, the dispersion state of the first electrically conductive particles is kept high. It is inferred that, since the first electrically conductive particles are finely dispersed in the layer obtained, the endless belt is excellent in the transferability onto a non-smooth paper sheet when used as an intermediate transfer body.

The average integral heating rate A/B is measured as follows. First, a thermometer (e.g., K thermocouple type JBS-7115-5M-K manufactured by GRAPHTEC Corporation) is connected to a data recorder manufactured by GRAPHTEC Corporation (type: GL240) to measure the change in the temperature of the coated substrate over time in the drying step. Then the temperature at which the integral value (area) of the temperature of the coated substrate from the start of drying reaches one half the integral value (area) of the temperature of the coated substrate from the start of drying to the end of drying is defined as "the average integral value (A° C.)." Then the time (B min) from the start of drying to when the temperature of the coated substrate reaches the average integral value A° C. is determined, and the average integral heating rate A/B (° C./min) is computed.

The average integral heating rate A/B (° C./min) is preferably 5.74° C./min or higher and more preferably 8.0° C./min or higher.

No particular limitation is imposed on the method for adjusting the average integral heating rate A/B to the above-described range. Examples of the method when hot air is supplied to the surface of the first coating film to dry the first coating film include a method in which the velocity of the hot air at the surface of the first coating film is controlled and a method in which the temperature of the hot air is controlled.

The velocity of the hot air at the surface of the first coating film is, for example, in the range of from 0.1 m/s to 50 m/s inclusive, preferably in the range of from 1 m/s to 40 m/s inclusive, and more preferably in the range of from 1 m/s to 20 m/s inclusive.

The velocity of the hot air at the surface of the first coating film is measured as follows. Specifically, an anemometer (TM350 manufactured by TASCO) is used, and its probe is disposed on the surface of the coating film to measure the velocity.

The temperature of the hot air at the surface of the first coating film is, for example, in the range of from 100° C. to 280° C. inclusive, preferably in the range of from 100° C. to 250° C. inclusive, and more preferably in the range of from 110° C. to 235° C. inclusive.

The temperature of the hot air at the surface of the first coating film is measured by connecting a thermometer (e.g., K thermocouple type JBS-7115-5M-K manufactured by GRAPHTEC Corporation) to a data recorder manufactured by GRAPHTEC Corporation (type: GL240).

No particular limitation is imposed on the method for supplying the hot air to the surface of the first coating film, and examples thereof include a method in which hot air from a drying furnace is blown from a slit nozzle onto the surface of the first coating film and a method in which the hot air from the drying furnace is supplied directly to the first coating film. Of these, the method using the slit nozzle may be used from the viewpoint of ease of controlling the velocity of the hot air at the surface of the first coating film.

When the second drying step is performed, the second coating film formed in the second coating film forming step is dried in the second drying step. The method for drying the second coating film is the same as the method for drying the first coating film. The second drying step may be completed before the first coating film forming step is performed. The first coating film forming step may be performed before completion of the second drying step, and the first drying step may serve as part of the second drying step.

(Firing Steps)

As described above, in the method for producing the endless belt, the first firing step may be performed. In the first firing step, the first coating film dried in the first drying step is heated and fired. When, for example, the first resin is a polyimide resin, the polyamic acid contained in the first coating film is imidized in the first firing step, and the polyimide is thereby obtained.

The heating temperature in the first firing step is, for example, in the range of from 150° C. to 450° C. inclusive and preferably in the range of from 200° C. to 430° C. inclusive. The heating time in the first firing step is, for example, in the range of from 20 minutes to 180 minutes inclusive and preferably in the range of from 60 minutes to 150 minutes inclusive.

When the second layer is formed through the second coating solution preparing step, the second coating film forming step, and the second drying step in the course of production of the layered endless belt, a second firing step of firing the second coating film dried in the second drying step may be performed. The second firing step may serve also as the first firing step.

[Transfer Device]

A transfer device according to an exemplary embodiment includes: an intermediate transfer body having an outer circumferential surface onto which a toner image is to be transferred; a first transfer unit including a first transfer member that first-transfers the toner image formed on the surface of an image holding member onto the outer circumferential surface of the intermediate transfer body; and a second transfer unit including a second transfer member that is disposed in contact with the outer circumferential surface of the intermediate transfer body and second-transfers the toner image transferred onto the outer circumferential surface of the intermediate transfer body onto a surface of a recording medium. The endless belt according to the preceding exemplary embodiment is used as the intermediate transfer body.

In the first transfer unit, the first transfer member is disposed so as to face the image holding member with the intermediate transfer body therebetween. In the first transfer unit, the first transfer member is used to apply a voltage whose polarity is opposite to the charge polarity of the toner to the intermediate transfer body, and the toner image is thereby first-transferred onto the outer circumferential surface of the intermediate transfer body.

In the second transfer unit, the second transfer member is disposed on the toner image holding side of the intermediate transfer body. The second transfer unit further includes, in addition to the second transfer member, a back member disposed on the side opposite to the toner image holding side of the intermediate transfer body. In the second transfer unit, the intermediate transfer body and a recording medium are sandwiched between the second transfer member and the back member, and a transfer electric field is formed to second-transfer the toner image on the intermediate transfer body onto the recording medium.

The second transfer member may be a second transfer roller or may be a second transfer belt. The back member used is, for example, a back roller.

The transfer device according to the present exemplary embodiment may be a transfer device that transfers a toner image onto the surface of a recording medium through a plurality of intermediate transfer bodies. Specifically, the transfer device may be, for example, as follows. A toner image is first-transferred from the image holding member onto a first intermediate transfer body, and the toner image is second-transferred from the first intermediate transfer body onto a second intermediate transfer body. Then the toner image is third-transferred from the second intermediate transfer body onto a recording medium.

When the transfer device includes a plurality of intermediate transfer bodies, the endless belt according to the preceding exemplary embodiment is applied to at least the intermediate transfer body that transfers a toner image onto a recording medium.

To increase the image formation speed of an image forming apparatus, the conveyance speed of a recording medium is increased. In this case, it is necessary to apply a high electric field for second transfer in the transfer device and to increase the contact width (also referred to as the nip width) between the intermediate transfer body and the second transfer member in order to obtain sufficient transferability. However, when the contact width between the intermediate transfer body and the second transfer member is increased, the probability of exposure to abnormal discharge increases, so that the non-electrostatic adhesion between the outer circumferential surface of the intermediate transfer body and a toner image increases. Therefore, when, in particular, a non-smooth paper sheet is used as a recording medium, transferability may rather deteriorate.

However, since the transfer device according to the present exemplary embodiment includes the endless belt according to the preceding exemplary embodiment as the intermediate transfer body, even when second transfer is performed using a high electric field, abnormal discharge is unlikely to occur, and a reduction in the transferability onto a non-smooth paper sheet is prevented.

With the endless belt according to the preceding exemplary embodiment used as the intermediate transfer body, since the non-electrostatic adhesion between the outer circumferential surface of the intermediate transfer body and a toner image is low, the transferability onto a non-smooth paper sheet is improved.

Specifically, for example, even when the contact width between the intermediate transfer body and the second transfer member is increased to from 0.2 cm to 4.0 cm inclusive (preferably from 0.2 cm to 3.0 cm inclusive, more preferably from 0.2 cm to 2.8 cm inclusive, and still more preferably from 0.4 cm to 3.0 cm inclusive), a reduction in the transferability onto a non-smooth paper sheet is prevented.

More specifically, in the case where the second transfer member is a second transfer roller, even when the contact width between the intermediate transfer body and the second transfer roller is increased to from 0.2 cm to 4.0 cm inclusive (preferably from 0.2 cm to 3.0 cm inclusive, more preferably from 0.2 cm to 2.8 cm inclusive, and still more preferably from 0.4 cm to 3.0 cm inclusive), a reduction in the transferability onto a non-smooth paper sheet is prevented.

In the case where the second transfer member is a second transfer belt, even when the contact width between the intermediate transfer body and the second transfer belt is increased to from 0.2 cm to 4.0 cm inclusive (preferably from 0.2 cm to 3.0 cm inclusive, more preferably from 0.2 cm to 2.8 cm inclusive, and still more preferably from 0.4 cm to 3.0 cm inclusive), a reduction in the transferability onto a non-smooth paper sheet is prevented.

The contact width is the length of a contact portion between the intermediate transfer body and the second transfer member and is the length in the circumferential direction of the intermediate transfer body.

[Image Forming Apparatus]

An image forming apparatus according to an exemplary embodiment includes: a toner image forming device that forms a toner image on a surface of an image holding member; and a transfer device that transfers the toner image formed on the surface of the image holding member onto a surface of a recording medium. The transfer device according to the preceding exemplary embodiment is applied to the above transfer device.

The toner image forming device is, for example, a device including: the image holding member; a charging unit for charging the surface of the image holding member; an electrostatic latent image forming unit that forms an electrostatic latent image on the charged surface of the image holding member; and a developing unit that develops the electrostatic latent image formed on the surface of the image holding member using a developer containing a toner to thereby form a toner image.

The image forming apparatus according to the present exemplary embodiment is applied to well-known image forming apparatuses such as: an apparatus including fixing means for fixing a toner image transferred onto a surface of a recording medium; an apparatus including cleaning means for cleaning the surface of the image holding member after transfer of a toner image but before charging; an apparatus including charge eliminating means for eliminating charges on the surface of the image holding member after transfer of a toner image but before charging by irradiating the surface of the image holding member with charge elimination light; and an apparatus including an image holding member-heating member for increasing the temperature of the image holding member to reduce relative temperature.

The image forming apparatus according to the present exemplary embodiment may be an image forming apparatus of a dry development type or an image forming apparatus of a wet development type (a development type using a liquid developer).

In the image forming apparatus according to the present exemplary embodiment, for example, a portion including the image holding member may have a cartridge structure that is detachable from the image forming apparatus (this portion may be a process cartridge). The process cartridge used may include a toner image forming device and a transfer device.

An example of the image forming apparatus according to the present exemplary embodiment will be described with reference to the drawings. However, the image forming apparatus according to the present exemplary embodiment is not limited thereto. In the following description, major components shown in the drawings will be described, and description of other components will be omitted.

(Image Forming Apparatus)

FIG. 1 is a schematic illustration showing the structure of the image forming apparatus according to the present exemplary embodiment.

As shown in FIG. 1, the image forming apparatus 100 according to the present exemplary embodiment is, for example, an intermediate transfer type image forming apparatus having a so-called tandem configuration and includes: a plurality of image forming units 1Y, 1M, 1C, and 1K (examples of the toner image forming device) that form toner images of respective colors by an electrophotographic process; first transfer units 10 that transfer (first-transfer) the color toner images formed by the image forming units 1Y, 1M, 1C, and 1K sequentially onto an intermediate transfer belt 15; a second transfer unit 20 that transfers (second-transfers) all the superposed toner images transferred onto the intermediate transfer belt 15 at once onto a paper sheet K used as a recording medium; and a fixing device 60 that fixes the second-transferred images onto the paper sheet K. The image forming apparatus 100 further includes a controller 40 that controls the operation of each device (each unit).

Each of the image forming units 1Y, 1M, 1C, and 1K of the image forming apparatus 100 includes a photoreceptor 11 (an example of the image holding member) that rotates in the direction of an arrow A and holds a toner image formed on its surface.

A charging unit 12 that charges the photoreceptor 11 and serves as an example of the charging unit is disposed near the circumference of the photoreceptor 11. A laser exposure unit 13 serving as an example of the electrostatic latent image forming unit and used to write an electrostatic latent image on the photoreceptor 11 is disposed above the photoreceptor 11 (in FIG. 1, an exposure beam is denoted by symbol Bm).

A developing unit 14 that serves as an example of the developing unit, contains a color toner, and visualizes the electrostatic latent image on the photoreceptor 11 with the toner is disposed near the circumference of the photoreceptor 11, and a first transfer roller 16 is provided, which transfers the color toner image formed on the photoreceptor 11 onto the intermediate transfer belt 15 in a corresponding first transfer unit 10.

A photoreceptor cleaner 17 that removes the toner remaining on the photoreceptor 11 is disposed near the circumference of the photoreceptor 11. These electrophotographic devices including the charging unit 12, the laser exposure unit 13, the developing unit 14, the first transfer roller 16, and the photoreceptor cleaner 17 are sequentially arranged in the rotation direction of the photoreceptor 11. The image forming units 1Y, 1M, 1C, and 1K are arranged substantially linearly in the order of yellow (Y), magenta (M), cyan (C), and black (K) from the upstream side of the intermediate transfer belt 15.

The intermediate transfer belt 15 is circulated (rotated) by various rollers in a direction B shown in FIG. 1 at a speed appropriate for its intended use. These rollers include: a driving roller 31 driven by a motor (not shown) excellent in constant speed property to rotate the intermediate transfer belt 15; a support roller 32 that supports the intermediate transfer belt 15 extending substantially linearly in the arrangement direction of the photoreceptors 11; a tension applying roller 33 that applies tension to the intermediate transfer belt 15 and serves as a correction roller for preventing meandering of the intermediate transfer belt 15; a back roller 25 disposed in the second transfer unit 20; and a cleaning back roller 34 disposed in a cleaning unit in which toner remaining on the intermediate transfer belt 15 is scraped off.

Each first transfer unit 10 includes a corresponding first transfer roller 16 facing a corresponding photoreceptor 11 with the intermediate transfer belt 15 therebetween. The first transfer roller 16 is disposed so as to be pressed against the photoreceptor 11 with the intermediate transfer belt 15 therebetween, and a voltage (first transfer bias) whose polarity is opposite to the charge polarity of the toner (negative polarity, the same applies to the following) is applied to the first transfer roller 16. Therefore, the toner images on the photoreceptors 11 are electrostatically attracted to the intermediate transfer belt 15 in a sequential manner, and the toner images are superposed on the intermediate transfer belt 15.

The second transfer unit 20 includes the back roller 25 and a second transfer roller 22 disposed on the toner image holding surface side of the intermediate transfer belt 15.

The back roller 25 is formed such that its surface resistivity is from $1\times10^{7}\Omega/\square$ to $1\times10^{10}\Omega/\square$ inclusive, and its hardness is set to, for example, 70° (ASKER C manufactured by Kobunshi Keiki Co., Ltd., the same applies to the following). The back roller 25 is disposed on the back side of the intermediate transfer belt 15 and forms a counter electrode of the second transfer roller 22, and a metallic feeding roller 26 to which a second transfer bias is stably applied is disposed in contact with the back roller 25.

The second transfer roller 22 is a cylindrical roller having a volume resistivity of from $10^{7.5}\Omega/\square$ to $10^{8.5}\Omega/\square$ inclusive. The second transfer roller 22 is disposed so as to be pressed against the back roller 25 with the intermediate transfer belt 15 therebetween. The second transfer roller 22 is grounded, and the second transfer bias is formed between the second transfer roller 22 and the back roller 25. The toner images are second-transferred onto a paper sheet K conveyed to the second transfer unit 20.

An intermediate transfer belt cleaning member 35 is disposed downstream of the second transfer unit 20 so as to be separable from the intermediate transfer belt 15. The intermediate transfer belt cleaning member 35 removes toner and paper powder remaining on the intermediate transfer belt 15 after second transfer to thereby clean the outer circumferential surface of the intermediate transfer belt 15.

A second transfer roller cleaning member 22A is disposed downstream of the second transfer roller 22 of the second transfer unit 20. The second transfer roller cleaning member 22A removes toner and paper powder remaining on the second transfer roller 22 after second transfer to thereby clean the outer circumferential surface of the intermediate transfer belt 15. Examples of the second transfer roller cleaning member 22A include a cleaning blade. A cleaning roller may also be used.

The intermediate transfer belt 15, the first transfer rollers 16, and the second transfer roller 22 correspond to an example of the transfer device.

Figure 2:
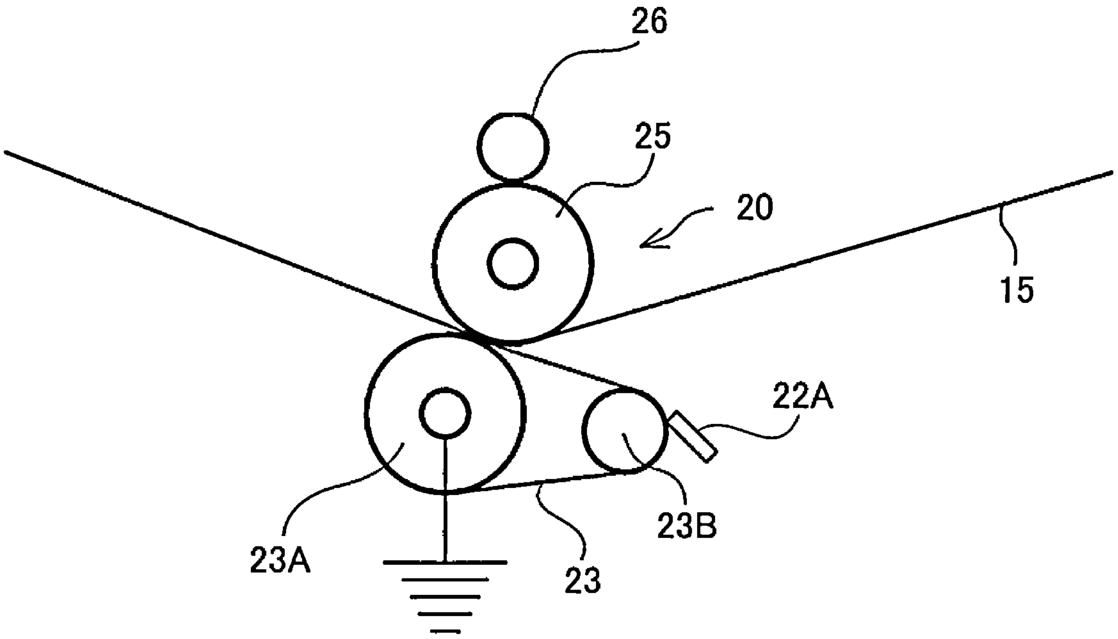
FIG. 2 is a schematic illustration showing the periphery of a second transfer unit in another example of the image forming apparatus according to the exemplary embodiment.

The image forming apparatus 100 may include a second transfer belt (an example of the second transfer member) instead of the second transfer roller 22. Specifically, as shown in FIG. 2, the image forming apparatus 100 may include a second transfer unit including a second transfer belt 23, a driving roller 23A disposed so as to face the back roller 25 with the intermediate transfer belt 15 and the second transfer belt 23 interposed therebetween, and an idler roller 23B that, together with the driving roller 23A, supports the second transfer belt 23 under tension.

A reference sensor (home position sensor) 42 that generates a reference signal used as a reference for image formation timings in the image forming units 1Y, 1M, 1C, and 1K is disposed upstream of the yellow image forming unit 1Y. An image density sensor 43 for image quality adjustment is disposed downstream of the black image forming unit 1K. When the reference sensor 42 detects a mark provided on the back side of the intermediate transfer belt 15, the reference sensor 42 generates the reference signal. The controller 40 issues instructions in response to the reference signal to start image formation in the image forming units 1Y, 1M, 1C, and 1K.

The image forming apparatus according to the present exemplary embodiment further includes, as conveyer means for conveying a paper sheet K: a paper sheet container 50 that houses paper sheets K; a paper feed roller 51 that picks up and conveys the paper sheets K stacked in the paper sheet container 50 one by one at predetermined timing; conveyer rollers 52 that convey each paper sheet K fed by the paper feed roller 51; a conveying guide 53 that feeds the paper sheet K conveyed by the conveyer rollers 52 to the second transfer unit 20; a conveyer belt 55 that conveys, to the fixing device 60, the paper sheet K conveyed by the second transfer roller 22 after second transfer; and a fixation entrance guide 56 that guides the paper sheet K to the fixing device 60.

Next, a basic image forming process of the image forming apparatus according to the present exemplary embodiment will be described.

In the image forming apparatus according to the present exemplary embodiment, image data outputted from, for example, an unillustrated image reading device or an unillustrated personal computer (PC) is subjected to image processing in an unillustrated image processing device, and image forming operations are performed in the image forming units 1Y, 1M, 1C, and 1K.

In the image processing device, the inputted reflectance data is subjected to various types of image processing such as shading compensation, misregistration correction, lightness/color space transformation, gamma correction, frame erasure, and various types of image editing such as color editing and move editing. The image data subjected to the image processing is converted to four types of color tone data including Y color data, M color data, C color data, and K color data, and they are outputted to the respective laser exposure units 13.

In each of the laser exposure units 13, the photoreceptor 11 of a corresponding one of the image forming units 1Y, 1M, 1C, and 1K is irradiated with an exposure beam Bm emitted from, for example, a semiconductor laser according to the inputted color tone data. In each of the image forming units 1Y, 1M, 1C, and 1K, the surface of the photoreceptor 11 is charged by the charging unit 12 and is then scanned and exposed using the laser exposure unit 13, and an electrostatic latent image is thereby formed. The electrostatic latent images formed are developed in the respective image forming units 1Y, 1M, 1C, and 1K to thereby form Y, M, C, and K color images.

The toner images formed on the photoreceptors 11 of the image forming units 1Y, 1M, 1C, and 1K are transferred onto the intermediate transfer belt 15 in the first transfer units 10 in which the photoreceptors 11 come into contact with the intermediate transfer belt 15. More specifically, in each of the first transfer units 10, a voltage (first transfer bias) whose polarity is opposite to the charge polarity (negative polarity) of the toner is applied by the first transfer roller 16 to the base of the intermediate transfer belt 15. The toner images are thereby sequentially superposed onto the outer circumferential surface of the intermediate transfer belt 15, and the first transfer is completed.

After the toner images have been sequentially first-transferred onto the outer circumferential surface of the intermediate transfer belt 15, the intermediate transfer belt 15 moves, and the toner images are conveyed toward the second transfer unit 20. When the toner images are conveyed toward the second transfer unit 20, the paper feed roller 51 in the conveyer means starts rotating at the timing of conveyance of the toner images to the second transfer unit 20 to feed a paper sheet K of the intended size from the paper sheet container 50. The paper sheet K fed by the paper feed roller 51 is conveyed by the conveyer rollers 52 and reaches the second transfer unit 20 through the transfer guide 53. Before the paper sheet K reaches the second transfer unit 20, the paper sheet K is temporarily stopped. Then a registration roller (not shown) starts rotating at an appropriate timing determined by the movement of the intermediate transfer belt 15 with the toner images held thereon, and the position of the paper sheet K is thereby aligned with the position of the toner images.

In the second transfer unit 20, the second transfer roller 22 is pressed against the back roller 25 through the intermediate transfer belt 15 therebetween. In this case, the paper sheet K conveyed at the appropriate timing is pinched between the intermediate transfer belt 15 and the second transfer roller 22. Then, when a voltage (second transfer bias) whose polarity is the same as the charge polarity (negative polarity) of the toner is applied from the feeding roller 26, a transfer electric field is formed between the second transfer roller 22 and the back roller 25. All the unfixed toner images held on the intermediate transfer belt 15 are thereby electrostatically transferred at once onto the paper sheet K in the second transfer unit 20 in which the intermediate transfer belt 15 is pressed by the second transfer roller 22 and the back roller 25.

Then the paper sheet K with the toner images electrostatically transferred thereon is released from the intermediate transfer belt 15 and conveyed by the second transfer roller 22 to the conveyer belt 55 disposed downstream, with respect to the conveyance direction of the paper sheet, of the second transfer roller 22. The conveyer belt 55 conveys the paper sheet K to the fixing device 60 at an optimal conveyance speed for the fixing device 60. The unfixed toner images on the paper sheet K conveyed to the fixing device 60 are subjected to fixation processing using heat and pressure by the fixing device 60 and thereby fixed onto the paper sheet K. The paper sheet K with the fixed image formed thereon is conveyed to an output sheet container (not shown) disposed in an output unit of the image forming apparatus.

After completion of transfer onto the paper sheet K, the toner remaining on the intermediate transfer belt 15 is conveyed to the cleaning unit by the rotation of the intermediate transfer belt 15 and is removed from the intermediate transfer belt 15 by the cleaning back roller 34 and the intermediate transfer belt cleaning member 35.

Although the exemplary embodiments have been described, the present disclosure is not to be construed as being limited to the exemplary embodiments, and various modifications, changes, and improvements are possible.

EXAMPLES

Examples of the present disclosure will be described, but the present disclosure is not limited to the following Examples. In the following description, "parts" and "%" are based on mass, unless otherwise specified.

Example A1

<Synthesis of Polyamic Acid>

A polyamic acid DA-A1 having amino groups at both ends of its molecular chain and a polyamic acid DC-A1 having carboxy groups at both ends of its molecular chain are synthesized by the following methods.

—Preparation of Polyamic Acid Solution DA-A1—

83.48 g (416.9 millimoles) of 4,4'-diaminodiphenyl ether (hereinafter abbreviated as "ODA") that is a diamine compound is added to 800 g of N-methyl-2-pyrrolidone (hereinafter abbreviated as "NMP") and dissolved therein at room temperature (25° C.) under stirring.

Next, 116.52 g (396.0 millimoles) of 3,3',4,4'-biphenyltetracarboxylic dianhydride (hereinafter abbreviated as "BPDA") that is a tetracarboxylic dianhydride is gradually added to the mixture. After the tetracarboxylic dianhydride has been added and dissolved, the reaction mixture is heated to a temperature of 60° C. and then subjected to a polymerization reaction for 20 hours while the temperature of the reaction mixture is maintained at 60° C. to thereby obtain a reaction mixture containing the polyamic acid DA-A1 and NMP.

The reaction mixture obtained is filtered through a #800 stainless steel mesh and cooled to room temperature (25° C.), and a polyamic acid solution DA-A1 having a solution viscosity of 2.0 Pas at 25° C. is thereby obtained.

The solution viscosity of the polyamic acid solution is a value measured using an E type rotational viscometer TV-20H manufactured by Toki Sangyo Co., Ltd. with a standard rotor (1° 34"xR24) under the conditions of a measurement temperature of 25° C. and rotation speeds of 0.5 rpm (100 Pas or more) and 1 rpm (less than 100 Pas).

The solution viscosities of polyamic acid solutions obtained in the following Synthesis Examples are values measured as described above.

—Preparation of Polyamic Acid Solution DC-A1—

A polyamic acid solution DC-A1 containing the polyamic acid DC-A1 and NMP and having a solution viscosity of 6.0 Pas is obtained using the same procedure as in the above Synthetic Example except that 79.57 g (397.4 millimoles) of ODA and 120.43 g (409.3 millimoles) of BPDA are used.

<Preparation of Coating Solutions>

| Preparation of coating solution A1 (second coating solution) - | |
|---|---|
| Polyamic acid solution DA-A1 (solid content: 45% by mass) | 70 parts by mass |
| Polyamic acid solution DC-A1 (solid content: 15% by mass) | 30 parts by mass |
| Carbon black [dried, second electrically conductive particles, SPEACIAL BLACK 4 manufactured by Orion Engineered Carbons, volatile content: 18.0%, gas black (i.e., channel black), number average primary particle diameter: 25 nm (hereinafter abbreviated also as "SB-4")] | 26 parts by mass |

The polyamic acid solution DA-A1 having the above-described composition and the polyamic acid solution DC-A1 having the above-described composition are mixed, and SB-4 is added thereto. The mixture is subjected to dispersion treatment using a ball mill at 30° C. for 12 hours to disperse the SB-4 in the polyamic acid solution mixture. Then the solution mixture containing the SB-4 dispersed therein is filtered through a #400 stainless steel mesh to obtain a coating solution A1 used as the second coating solution.

| Preparation of coating solution B1 (first coating solution) - | |
|---|---|
| Polyamic acid solution DA-A1 (solid content: 45% by mass) | 70 parts by mass |
| Polyamic acid solution DC-Al (solid content: 15% by mass) | 30 parts by mass |
| Carbon black [dried, first electrically conductive particles, Emperor 2000 manufactured by Cabot Corporation, number average primary particle diameter: 9 nm] | 18 parts by mass |
| Surfactant (SURFLON ® S-431): An amount that gives a content shown in Tables 1-1-1 and 1-1-2 (the content in a layer containing the surfactant (the same applies to the following)) | |

The polyamic acid solution DA-A1 having the above-described composition and the polyamic acid solution DC-A1 having the above-described composition are mixed, and Emperor 2000 and the surfactant are added thereto. The mixture is subjected to dispersion treatment using a ball mill at 30° C. for 12 hours to disperse the Emperor 2000 in the polyamic acid solution mixture. Then the solution mixture containing the Emperor 2000 dispersed therein is filtered through a #800 stainless steel mesh to obtain a coating solution B1 used as the first coating solution.

The above-described carbon black [Emperor 2000 manufactured by Cabot Corporation] is basic carbon black.

<Production of Belt A1>

—Release Agent Treatment of Substrate to be Coated—

A SUS-made hollow cylindrical mold with an outer diameter of 366 mm and a length of 400 mm is prepared as a substrate to be coated, and its outer circumferential surface is coated with a silicone-based release agent (product name: SEPA-COAT manufactured by Shin-Etsu Chemical Co., Ltd.). The resulting mold is subjected to drying treatment (release agent treatment).

—Formation of Second Coating Film—

While the hollow cylindrical mold subjected to the release agent treatment is rotated circumferentially at a speed of 10 rpm, the coating solution A1 is discharged from a dispenser having a diameter of 1.0 mm onto an end portion of the hollow cylindrical mold. Then a constant pressure is applied to the coating solution A1 using a metal blade disposed on the mold to coat the mold with the coating solution A1. By moving the dispenser unit in the axial direction of the hollow cylindrical mold at a speed of 100 mm/minute, the coating solution A1 is helically applied to the hollow cylindrical mold to thereby form the second coating film.

—Drying of Second Coating Film—

Then the mold and the second coating film are subjected to drying treatment in a drying furnace at 140° C. in an air atmosphere for 15 minute while rotated at 10 rpm.

The solvent is volatilized from the second coating film during drying, and the second coating film is thereby transformed into a polyamic acid resin molded article (base 1) having self-supporting ability.

—Formation and Drying of First Coating Film—

The coating solution B1 is applied to the outer circumferential surface of the base 1 using the same rotation coating method as that used for the application of the coating solution A1 to form the first coating film, and then the first coating film is subjected to drying treatment in a drying furnace at 140° C. in an air atmosphere for 15 minutes while rotated at 10 rpm. The average integral heating rate A/B in the drying step for the first coating film is 6.00° C./min.

—Firing—

Next, the resulting article is placed in an oven at a highest temperature of 320° C. for 4 hours to thereby obtain an endless belt A1. The total layer thickness of the endless belt A1 (the total thickness of the base layer and the surface layer) is 80 μm. Specifically, the thickness of the base layer is 26.7 μm, and the thickness of the surface layer is 53.3 μm.

The endless belt A1 is removed from the mold. A holder is used to support the removed endless belt A1 under tension, and the endless belt A1 is cut using a cutter with an adjusted insertion angle to obtain an annular member with a diameter ϕ of 366 mm and a width of 369 mm. The thus-produced endless belt is used as a belt A1.

The content of the electrically conductive carbon particles with respect to the total mass of the base layer in the belt A1 is 22% by mass, and the content of the electrically conductive carbon particles with respect to the total mass of solids in the surface layer is 18% by mass.

The volume resistivity of the belt A1 and the surface resistivity of its outer circumferential surface are measured using the above-described methods. The common logarithm of the volume resistivity is 11.5 (log Ω·cm), and the common logarithm of the surface resistivity is 11.5 (log Ω/sq.).

Example A2

<Production of Belt A2>

An endless belt A2 is obtained using the same procedure as that for the endless belt A1 except that, in the drying step of the first coating film, the first coating film is subjected to drying treatment at 170° C. in an air atmosphere for 20 minutes instead of the drying treatment at 140° C. in an air atmosphere for 15 minutes. The total layer thickness of the endless belt A2 (the total thickness of the base layer and the surface layer) is 80 μm. Specifically, the thickness of the base layer is 26.7 μm, and the thickness of the surface layer is 53.3 μm. The average integral heating rate A/B in the drying step of the first coating film is 6.5° C./min.

The endless belt A2 is cut in the same manner as that for the endless belt A1 to obtain an annular member with a diameter ϕ of 366 mm and a width of 369 mm. The thus-produced endless belt is used as a belt A2.

The content of the electrically conductive carbon particles with respect to the total mass of the base layer in the belt A2 is 22% by mass, and the content of the electrically conductive carbon particles with respect to the total mass of solids in the surface layer is 19% by mass.

The volume resistivity of the belt A2 and the surface resistivity of its outer circumferential surface are measured using the above-described methods. The common logarithm of the volume resistivity is 11.8 (log Ω·cm), and the common logarithm of the surface resistivity is 12.0 (log Ω/sq.).

Example A3

<Production of Belt A3>

An endless belt A3 is obtained using the same procedure as that for the endless belt A1 except that, in the drying step of the first coating film, the first coating film is subjected to drying treatment at 115° C. in an air atmosphere for 15 minutes instead of the drying treatment at 140° C. in an air atmosphere for 15 minutes. The total layer thickness of the endless belt A3 (the total thickness of the base layer and the surface layer) is 80 μm. Specifically, the thickness of the base layer is 26.7 μm, and the thickness of the surface layer is 53.3 μm. The average integral heating rate A/B in the drying step of the first coating film is 5.74° C./min.

The endless belt A3 is cut in the same manner as that for the endless belt A1 to obtain an annular member with a diameter ϕ of 366 mm and a width of 369 mm. The thus-produced endless belt is used as a belt A3.

The content of the electrically conductive carbon particles with respect to the total mass of the base layer in the belt A3 is 22% by mass, and the content of the electrically conductive carbon particles with respect to the total mass of solids in the surface layer is 18% by mass.

The volume resistivity of the belt A3 and the surface resistivity of its outer circumferential surface are measured using the above-described methods. The common logarithm of the volume resistivity is 10.8 (log Ω·cm), and the common logarithm of the surface resistivity is 11.2 (log Ω/sq.).

Example A4

<Production of Belt A4>

An endless belt A4 is obtained using the same procedure as that for the endless belt A1 except that, in the drying step of the second coating film, the second coating film is subjected to drying treatment at 135° C. in an air atmosphere for 15 minutes instead of the drying treatment at 140° C. in an air atmosphere for 15 minutes. The total layer thickness of the endless belt A4 (the total thickness of the base layer and the surface layer) is 80 μm. Specifically, the thickness of the base layer is 26.7 μm, and the thickness of the surface layer is 53.3 μm. The average integral heating rate A/B in the drying step of the first coating film is 5.9° C./min.

The endless belt A4 is cut in the same manner as that for the endless belt A1 to obtain an annular member with a diameter ϕ of 366 mm and a width of 369 mm. The thus-produced endless belt is used as a belt A4.

The content of the electrically conductive carbon particles with respect to the total mass of the base layer in the belt A4 is 22% by mass, and the content of the electrically conductive carbon particles with respect to the total mass of solids in the surface layer is 18.2% by mass.

The volume resistivity of the belt A4 and the surface resistivity of its outer circumferential surface are measured using the above-described methods. The common logarithm of the volume resistivity is 11.3 (log Ω·cm), and the common logarithm of the surface resistivity is 11.3 (log Ω/sq.).

Example B1

<Production of Belt B1>

The same mold as the substrate to be coated used to produce the endless belt A1 is prepared and subjected to the same release agent treatment.

Using the same rotation application method as that for the application of the coating solution A1 in the production of the endless belt A1, the coating solution B1 is applied to the outer circumferential surface of the substrate subjected to the release agent treatment to form the first coating film. Then the first coating film is subjected to drying treatment in a drying furnace at 140° C. in an air atmosphere for 15 minutes while rotated at 10 rpm. The average integral heating rate A/B in the drying step of the first coating film is 6.0° C./min.

Next, the mold is placed in an oven at a highest temperature of 320° C. for 4 hours to obtain an endless belt B1. The total layer thickness of the endless belt B1 (i.e., the thickness of the single layer) is 80 μm.

The endless belt B1 is removed from the mold and cut in the same manner as that for the endless belt A1 to thereby obtain an annular member with a diameter ϕ of 366 mm and a width of 369.5 mm. The thus-obtained endless belt is used as a belt B1.

The content of the electrically conductive carbon particles with respect to the total mass of the belt B1 (i.e., with respect to the total mass of solids in the layer containing the resin and the electrically conductive particles) is 20% by mass.

The volume resistivity of the belt B1 and the surface resistivity of its outer circumferential surface are measured using the above-described methods. The common logarithm of the volume resistivity is 11.4 (log Ω·cm), and the common logarithm of the surface resistivity is 11.2 (log Ω/sq.).

Example B2

<Production of Belt B2>

36 g (20 phr) of carbon black (dried) [Emperor 2000 manufactured by Cabot Corporation, number average primary particle diameter: 9 nm] and a surfactant (SURFLON® S-431, an amount giving a content shown in Tables 1-1-1 and 1-1-2) are added to 1000 g of a wholly aromatic polyimide varnish (solid content: 18% by mass, U-Imide KX manufactured by UNITIKA Ltd., solvent: NMP). The mixture is caused to pass through an orifice with a diameter ϕ of 0.1 mm at a pressure of 200 MPa using a high-pressure collision-type dispersing machine (manufactured by Genus K. K). Then the resulting slurry is divided into two portions, and these portions are caused to collide with each other. This procedure is repeated 5 times to disperse the carbon black, and a coating solution B2 used as the first coating solution is thereby obtained.

The obtained coating solution B2 is applied to the outer surface of a SUS-made pipe with a diameter ϕ of 366 mm using a flow coating method such that a prescribed thickness is obtained. The coating solution B2 is dried at 150° C. for 30 minutes while the pipe is rotated, and the pipe is placed in an oven at 320° C. for 4 hours and then removed to thereby obtain a SUS-made pipe with an endless belt B2 formed on its outer surface. The total layer thickness of the endless belt B2 (i.e., the thickness of the single layer) is 80 μm. The average integral heating rate A/B in the drying step is 8.0° C./min.

The endless belt B2 covering the outer surface is removed from the SUS-made pipe and cut such that the width of the belt is 369 mm to thereby obtain a belt B2 used as a belt-shaped intermediate transfer body. The content of the electrically conductive carbon particles with respect to the total mass of the belt B2 (i.e., with respect to the total mass of solids in the layer containing the resin and the electrically conductive particles) is 22% by mass.

The volume resistivity of the belt B2 and the surface resistivity of its outer circumferential surface are measured using the above-described methods. The common logarithm of the volume resistivity is 10.1 (log Ω·cm), and the common logarithm of the surface resistivity is 10.0 (log Ω/sq.).

Example B3

<Production of Belt B3>

An endless belt B3 is obtained using the same procedure as in Example B2 except that 37.8 g (21 phr) of carbon black [dried, first electrically conductive particles, Emperor 2000 manufactured by Cabot Corporation, number average primary particle diameter: 9 nm] is used and that the procedure for colliding two portions of the slurry using the high-pressure collision-type dispersing machine (manufactured by Genus K. K) is repeated 10 times. The belt B3 obtained is used as a belt-shaped intermediate transfer body. The total layer thickness of the endless belt B3 (i.e., the thickness of the single layer) is 80 μm. The content of the electrically conductive carbon particles with respect to the total mass of the belt B3 (i.e., with respect to the total mass of solids in the layer containing the resin and the electrically conductive particles) is 21.5% by mass.

The volume resistivity of the belt B3 and the surface resistivity of its outer circumferential surface are measured using the above-described methods. The common logarithm of the volume resistivity is 10.0 (log Ω·cm), and the common logarithm of the surface resistivity is 9.8 (log Ω/sq.).

Example B4

<Production of Belt B4>

An endless belt B4 is obtained using the same procedure as in Example B2 except that 39.6 g (22 phr) of carbon black [dried, first electrically conductive particles, Emperor 2000 manufactured by Cabot Corporation, number average primary particle diameter: 9 nm] is used and that the procedure for colliding two portions of the slurry using the high-pressure collision-type dispersing machine (manufactured by Genus K. K) is repeated 20 times. The belt B4 obtained is used as a belt-shaped intermediate transfer body. The total layer thickness of the endless belt B4 (i.e., the thickness of the single layer) is 80 μm. The content of the electrically conductive carbon particles with respect to the total mass of the belt B4 (i.e., with respect to the total mass of solids in the layer containing the resin and the electrically conductive particles) is 22.5% by mass.

The volume resistivity of the belt B4 and the surface resistivity of its outer circumferential surface are measured using the above-described methods. The common logarithm of the volume resistivity is 9.8 (log Ω·cm), and the common logarithm of the surface resistivity is 9.5 (log Ω/sq.).

Example B5

<Production of Belt B5>

An endless belt B5 is obtained using the same procedure as in Example B2 except that 43.2 g (24 phr) of carbon black (dried) (FW285 manufactured by Orion Engineered Carbons, number average primary particle diameter: 11 nm) is used as the first electrically conductive particles and that the procedure for colliding two portions of the slurry using the high-pressure collision-type dispersing machine (manufactured by Genus K. K) is repeated 20 times. The belt B5 obtained is used as a belt-shaped intermediate transfer body. The total layer thickness of the endless belt B5 (i.e., the thickness of the single layer) is 80 μm. The content of the electrically conductive particles with respect to the total mass of the belt B5 (i.e., with respect to the total mass of solids in the layer containing the resin and the electrically conductive particles) is 24.6% by mass.

The volume resistivity of the belt B5 and the surface resistivity of its outer circumferential surface are measured using the above-described methods. The common logarithm of the volume resistivity is 9.9 (log Ω·cm), and the common logarithm of the surface resistivity is 9.6 (log Ω/sq.).

Example B6

<Production of Belt B6>

—Formation and Drying of First Coating Film—

The polyimide precursor solution (coating solution B1) is applied to the outer circumferential surface of a SUS mold having an outer diameter of 366 mm and a thickness of 10 mm using a flow coating method such that a desired thickness is obtained to thereby form the first coating film, and the first coating film is dried as follows.

Specifically, a slit nozzle (DLX series manufactured by Daico Thermotec Co., Ltd., slit width: 0.8 mm) installed in a blowing portion of a downflow-type hot air dryer is used with the wind velocity near the mold set to 6 m/s to heat the mold to 200° C. for 24 minutes. The average integral heating rate A/B in the drying step is 5.74° C./min.

After drying, the first coating film is sintered at 320° C. for 4 hours to thereby obtain an endless belt B6. The total layer thickness of the endless belt B6 (i.e., the thickness of the single layer) is 80 μm.

The obtained endless belt B6 is removed from the mold and cut such that the width of the belt is 369 mm, and a belt B6 is thereby obtained. The content of the electrically conductive carbon particles with respect to the total mass of the belt B6 (i.e., with respect to the total mass of solids in the layer containing the resin and the electrically conductive particles) is 19% by mass.

The volume resistivity of the belt B6 and the surface resistivity of its outer circumferential surface are measured using the above-described methods. The common logarithm of the volume resistivity is 11.5 (log Ω·cm), and the common logarithm of the surface resistivity is 11.3 (log Ω/sq.).

Example B7

<Production of Belt B7>

An endless belt B7 is obtained using the same procedure as that for the endless belt B6 except that, in the drying step, the mold is heated to 235° C. for 21 minutes using the slit nozzle with the wind velocity near the mold set to 6 m/s instead of heating the mold to 200° C. for 24 minutes using the slit nozzle. The average integral heating rate A/B in the drying step is 6.84° C./min, and the total layer thickness of the endless belt B7 (i.e., the thickness of the single layer) is 80 μm.

The obtained endless belt B7 is removed from the mold and cut such that the width of the belt is 369 mm, and a belt B7 is thereby obtained. The content of the electrically conductive carbon particles with respect to the total mass of the belt B7 (i.e., with respect to the total mass of solids in the layer containing the resin and the electrically conductive particles) is 19% by mass.

The volume resistivity of the belt B7 and the surface resistivity of its outer circumferential surface are measured using the above-described methods. The common logarithm of the volume resistivity is 11.6 (log Ω·cm), and the common logarithm of the surface resistivity is 11.4 (log Ω/sq.).

Example B8

<Production of Belt B8>

An endless belt B8 is obtained using the same procedure as that for the endless belt B6 except that, in the drying step, the mold is heated to 200° C. for 16 minutes using the slit nozzle with the wind velocity near the mold set to 16 m/s instead of heating the mold to 200° C. for 24 minutes using the slit nozzle. The average integral heating rate A/B in the drying step is 9.56° C./min, and the total layer thickness of the endless belt B8 (i.e., the thickness of the single layer) is 80 μm.

The obtained endless belt B8 is removed from the mold and cut such that the width of the belt is 369 mm, and a belt B8 is thereby obtained. The content of the electrically conductive carbon particles with respect to the total mass of the belt B8 (i.e., with respect to the total mass of solids in the layer containing the resin and the electrically conductive particles) is 19% by mass.

The volume resistivity of the belt B8 and the surface resistivity of its outer circumferential surface are measured using the above-described methods. The common logarithm of the volume resistivity is 11.2 (log Ω·cm), and the common logarithm of the surface resistivity is 11.1 (log Ω/sq.).

Example B9

<Production of Belt B9>

| Preparation of coating solution B9 (first coating solution) - | |
|---|---|
| Polyamic acid solution DA-A1 (solid content: 45% by mass) | 70 parts by mass |
| Polyamic acid solution DC-Al (solid content: 15% by mass) | 30 parts by mass |
| Carbon black (dried, electrically conductive carbon particles) [Raven 5000 Ultra II manufactured by Birla, number average primary particle diameter: 8 nm (hereinafter referred to also as "Raven 5000")] | 18 parts by mass |

-continued

| Preparation of coating solution B9 (first coating solution) - |
|---|
| Surfactant (SURFLON ® S-431): An amount that gives a content shown in Tables 1-1-1 and 1-1-2 (the content in a layer containing the surfactant (the same applies to the following)) |

The polyamic acid solution DA-A1 having the above-described composition and the polyamic acid solution DC-A1 having the above-described composition are mixed, and Raven 5000 and the surfactant are added thereto. The mixture is subjected to dispersion treatment using a ball mill at 30° C. for 12 hours to disperse the Raven 5000 in the polyamic acid solution mixture. Then the solution mixture containing the Raven 5000 dispersed therein is filtered through a #800 stainless steel mesh to obtain a coating solution B9 used as the first coating solution. The coating solution B9 is used to form a film in the same manner as in B1 to thereby obtain an endless belt B9. The total thickness of the endless belt B9 (i.e., the thickness of the single layer) is 80 μm. The volume resistivity of the belt B9 and the surface resistivity of its outer circumferential surface are measured using the above-described methods. The common logarithm of the volume resistivity is 11.1 (log Ω·cm), and the common logarithm of the surface resistivity is 11.0 (log Ω/sq.).

Example C1

<Production of Belt C1>

37.8 g (22 phr) of carbon black [dried, first electrically conductive particles, Emperor 2000 manufactured by Cabot Corporation, number average primary particle diameter: 9 nm] is added to 1000 g of a wholly aromatic polyimide varnish (solid content: 18 wt %, HPC-9000 manufactured by Hitachi Chemical Co., Ltd., solvent: NMP), and a surfactant (SURFLON® S-431) is added in an amount that gives a content shown in Tables 1-1-1 and 1-1-2. The mixture is caused to pass through an orifice with a diameter ϕ of 0.1 mm at a pressure of 200 MPa using a high-pressure collision-type dispersing machine (manufactured by Genus K. K). Then the resulting slurry is divided into two portions, and these portions are caused to collide with each other. This procedure is repeated 10 times to disperse the carbon black, and a coating solution C1 used as the first coating solution is thereby obtained.

The same mold as the substrate to be coated used to produce the endless belt A1 is prepared and subjected to the same release agent treatment.

Using the same rotation application method as that for the application of the coating solution A1 in the production of the endless belt A1, the coating solution C1 is applied to the outer circumferential surface of the substrate subjected to the release agent treatment to form the first coating film. Then the first coating film is subjected to drying treatment in a drying furnace at 150° C. in an air atmosphere for 15 minutes while rotated at 10 rpm. The average integral heating rate A/B in the drying step of the first coating film is 6.0° C./min.

Next, the mold is placed in an oven at a highest temperature of 290° C. for 4 hours to obtain an endless belt C1. The total layer thickness of the endless belt (i.e., the thickness of the single layer) is 80 μm.

The endless belt C1 is removed from the mold and cut in the same manner as that for the endless belt A1 to thereby obtain an annular member with a diameter ϕ of 366 mm and a width of 369.5 mm. The thus-produced endless belt is used as a belt C1.

The content of the electrically conductive carbon particles with respect to the total mass of the belt C1 is 19% by mass.

The volume resistivity of the belt C1 and the surface resistivity of its outer circumferential surface are measured using the above-described methods. The common logarithm of the volume resistivity is 11.2 (log Ω·cm), and the common logarithm of the surface resistivity is 11.2 (log Ω/sq.).

Example C2

<Production of Belt C2>

37.8 g (22 phr) of carbon black [dried, first electrically conductive particles, Emperor 2000 manufactured by Cabot Corporation, number average primary particle diameter: 9 nm] is added to 1000 g of a wholly aromatic polyimide varnish (solid content: 18 wt %, HPC-9000 manufactured by Hitachi Chemical Co., Ltd., solvent: NMP), and a surfactant (SURFLON® S-431) is added in an amount that gives a content shown in Tables 1-1-1 and 1-1-2. The mixture is caused to pass through an orifice with a diameter ϕ of 0.1 mm at a pressure of 200 MPa using a high-pressure collision-type dispersing machine (manufactured by Genus K. K). Then the resulting slurry is divided into two portions, and these portions are caused to collide with each other. This procedure is repeated 10 times to disperse the carbon black, and a coating solution C2 used as the first coating solution is thereby obtained.

The obtained coating solution C2 is applied to the outer surface of a SUS-made pipe with a diameter ϕ of 366 mm using a flow coating method such that a prescribed thickness is obtained. The coating solution C2 is dried at 150° C. for 30 minutes while the pipe is rotated, and the pipe is placed in an oven at 290° C. for 1 hour and then removed to thereby obtain a SUS-made pipe with an endless belt C2 formed on its outer surface. The total layer thickness of the endless belt C2 (i.e., the thickness of the single layer) is 80 μm. The average integral heating rate A/B in the drying step is 7.2° C./min.

The endless belt C2 covering the outer surface is removed from the SUS-made pipe and cut such that the width of the belt is 369 mm to thereby obtain a belt C2 used as a belt-shaped intermediate transfer body. The content of the electrically conductive carbon particles with respect to the total mass of the belt C2 is 19% by mass.

The volume resistivity of the belt C2 and the surface resistivity of its outer circumferential surface are measured using the above-described methods. The common logarithm of the volume resistivity is 10.3 (log Ω·cm), and the common logarithm of the surface resistivity is 10.2 (log Ω/sq.).

Example C3

<Production of Belt C3>

An endless belt C3 is obtained using the same procedure as in Example C2 except that 36 g (20 phr) of carbon black [dried, first electrically conductive particles, Emperor 2000 manufactured by Cabot Corporation, number average primary particle diameter: 9 nm] is used as the first electrically conductive carbon particles and that the procedure for colliding two portions of the slurry using the high-pressure collision-type dispersing machine (manufactured by Genus K. K) is repeated 20 times. The belt C3 obtained is used as a belt-shaped intermediate transfer body. The total layer thickness of the endless belt C3 (i.e., the thickness of the single layer) is 80 μm. The content of the electrically conductive carbon particles with respect to the total mass of the belt C3 is 19% by mass.

The volume resistivity of the belt C3 and the surface resistivity of its outer circumferential surface are measured using the above-described methods. The common logarithm of the volume resistivity is 10.1 (log Ω·cm), and the common logarithm of the surface resistivity is 9.9 (log Ω/sq.).

Example D1

<Production of Belt D1>

180 g of pellets of a PEEK resin (450G manufactured by Victrex), 27 g (15 phr) of carbon black [dried, first electrically conductive particles, Emperor 2000 manufactured by Cabot Corporation, number average primary particle diameter: 9 nm], and a surfactant (SURFLON® S-431) in an amount that gives a content shown in Tables 1-1-1 and 1-1-2 are charged into a Henschel mixer (FM10C manufactured by Nippon Coke & Engineering Co., Ltd.) and mixed. The mixed composition is subjected to melt kneading using a twin-screw melt extrusion kneader (L/D60 manufactured by PARKER CORPORATION). The kneaded product is extruded from a ϕ5 hole into a string shape, and the extruded string is charged into a water tank to cool and solidify the string. The solidified string is cut to thereby obtain resin mixture pellets containing the carbon black.

The resin mixture pellets obtained are charged into a single-screw melt extruder (melt extruder L/D24 (manufactured by MITSUBA MFG. CO., LTD.)) whose temperature is set to a prescribed temperature (380° C.) and extruded into a hollow cylindrical shape from the gap between an annular die and a nipple while melted. While the extruded hollow cylindrical film is drawn from the extruder, the inner circumferential surface of the hollow cylindrical film is brought into contact with a sizing die (cooling die) whose temperature is set to a prescribed temperature (50° C.) to cool the hollow cylindrical film in order to fix the hollow cylindrical shape of the film and its diameter, and an endless belt D1 is thereby obtained.

The endless belt D1 is removed from the cooling die, and a holder is used to support the removed endless belt D1 under tension. Then the endless belt D1 is cut using a cutter with an adjusted insertion angle to obtain an annular member with a diameter ϕ of 366 mm and a width of 369 mm. The thus-produced endless belt is used as a belt D1. The total layer thickness of the belt D1 (i.e., the thickness of the single layer) is 80 μm.

The content of the electrically conductive carbon particles with respect to the total mass of the belt D1 is 13% by mass.

The volume resistivity of the belt D1 and the surface resistivity of its outer circumferential surface are measured using the above-described methods. The common logarithm of the volume resistivity is 11.1 (log Ω·cm), and the common logarithm of the surface resistivity is 11.3 (log Ω/sq.).

Example E1

<Production of Belt E1>

180 g of PPS resin powder (TORELINA T1881 manufactured by TORAY INDUSTRIES Inc.), 27 g (15 phr) of carbon black [dried, first electrically conductive particles, Emperor 2000 manufactured by Cabot Corporation, number average primary particle diameter: 9 nm], and a surfactant (SURFLON® S-431) in an amount that gives a content shown in Tables 1-1-1 and 1-1-2 are charged into a Henschel mixer (FM10C manufactured by Nippon Coke & Engineering Co., Ltd.) and mixed. The mixed composition is subjected to melt kneading using a twin-screw melt extrusion kneader (L/D60 manufactured by PARKER CORPORATION). The kneaded product is extruded from a ϕ5 hole into a string shape, and the extruded string is charged into a water tank to cool and solidify the string. The solidified string is cut to thereby obtain resin mixture pellets containing the carbon black.

The resin mixture pellets obtained are charged into a single-screw melt extruder (melt extruder L/D24 (manufactured by MITSUBA MFG. CO., LTD.)) whose temperature is set to a prescribed temperature (350° C.) and extruded into a hollow cylindrical shape from the gap between an annular die and a nipple while melted. While the extruded hollow cylindrical film is drawn from the extruder, the inner circumferential surface of the hollow cylindrical film is brought into contact with a sizing die (cooling die) whose temperature is set to a prescribed temperature (50° C.) to cool the hollow cylindrical film in order to fix the hollow cylindrical shape of the film and its diameter, and an endless belt E1 is thereby obtained.

The endless belt E1 is removed from the cooling die, and a holder is used to support the removed endless belt E1 under tension. Then the endless belt E1 is cut using a cutter with an adjusted insertion angle to obtain an annular member with a diameter ϕ of 366 mm and a width of 369 mm. The thus-produced endless belt is used as a belt E1. The total layer thickness of the belt E1 (i.e., the thickness of the single layer) is 80 μm.

The content of the electrically conductive carbon particles with respect to the total mass of the belt E1 is 13% by mass.

The volume resistivity of the belt E1 and the surface resistivity of its outer circumferential surface are measured using the above-described methods. The common logarithm of the volume resistivity is 10.9 (log Ω·cm), and the common logarithm of the surface resistivity is 11.2 (log Ω/sq.).

Comparative Example F1

<Production of Belt F1>

The same mold as the substrate to be coated used to produce the endless belt B1 is prepared and subjected to the same release agent treatment. Using the same rotation application method as that for the application of the coating solution B1 in the production of the endless belt B1, the coating solution B1 is applied to the outer circumferential surface of the substrate subjected to the release agent treatment to form a coating film. Then the coating film is subjected to drying treatment in a drying furnace at 140° C. in an air atmosphere for 15 minutes while rotated at 10 rpm.

Next, the mold is placed in an oven at a highest temperature of 320° C. for 4 hours to obtain an endless belt F1. The total layer thickness of the endless belt F1 (i.e., the thickness of the single layer) is 80 μm.

The endless belt F1 is removed from the mold and cut in the same manner as that for the endless belt B1 to thereby obtain an annular member with a diameter ϕ of 366 mm and a width of 369.5 mm. The thus-obtained endless belt is used as a belt F1.

The content of the electrically conductive carbon particles with respect to the total mass of the belt F1 is 19% by mass.

The volume resistivity of the belt F1 and the surface resistivity of its outer circumferential surface are measured using the above-described methods. The common logarithm of the volume resistivity is 11.1 (log Ω·cm), and the common logarithm of the surface resistivity is 11.1 (log Ω/sq.).

Comparative Example F2

<Production of Belt F2>

An endless belt F2 is obtained using the same procedure as that for the endless belt B6 except that, in the drying step, the mold is heated to 200° C. for 28 minutes by supplying the hot air from the drying furnace directly onto the first coating film with the wind velocity near the mold set to 0.8 m/s without using the slit nozzle instead of heating the mold to 200° C. for 24 minutes using the slit nozzle. The average integral heating rate A/B in the drying step is 3.55° C./min, and the total layer thickness of the endless belt F2 (i.e., the thickness of the single layer) is 80 μm.

The obtained endless belt F2 is removed from the mold and cut such that the width of the belt is 369 mm, and a belt F7 is thereby obtained. The content of the electrically conductive carbon particles with respect to the total mass of the belt F2 is 19% by mass.

The volume resistivity of the belt F2 and the surface resistivity of its outer circumferential surface are measured using the above-described methods. The common logarithm of the volume resistivity is 11.8 (log Ω·cm), and the common logarithm of the surface resistivity is 13.1 (log Ω/sq.).

Comparative Example F3

<Production of Belt F3>

An endless belt F3 is obtained using the same procedure as that for the endless belt B6 except that, in the drying step, the mold is heated to 235° C. for 24 minutes by supplying the hot air from the drying furnace directly onto the first coating film with the wind velocity near the mold set to 0.9 m/s without using the slit nozzle instead of heating the mold to 200° C. for 24 minutes using the slit nozzle. The average integral heating rate A/B in the drying step is 4.36° C./min, and the total layer thickness of the endless belt F3 (i.e., the thickness of the single layer) is 80 μm.

The obtained endless belt F3 is removed from the mold and cut such that the width of the belt is 369 mm, and a belt F3 is thereby obtained. The content of the electrically conductive carbon particles with respect to the total mass of the belt F3 is 18% by mass.

The volume resistivity of the belt F3 and the surface resistivity of its outer circumferential surface are measured using the above-described methods. The common logarithm of the volume resistivity is 12.2 (log Ω·cm), and the common logarithm of the surface resistivity is 12.8 (log Ω/sq.).

Examples G1 to G13

<Production of Belts G1 to G13>

Belts G1 to G13 are each obtained using the same procedure as that for the belt in one of Examples shown in Table 1-2 (shown in the "Base Example" column in Table 1-2) except that the type of surfactant and its amount (the amount (% by mass) with respect to the mass of a layer containing the surfactant) are changed as shown in Table 1-2.

Comparative Examples H1 and H2

<Production of Belts H1 and H2>

Belts H1 and H2 are each obtained using the same procedure as that for the belt in one of Examples shown in Table 1-2 (shown in the "Base Example" column in Table 1-2) except that the type of surfactant and its amount are changed as shown in Table 1-2.

Types of Surfactants Used in Examples G1 to G13 and Comparative Examples H1 and H2

- SURFLON® S-431: a product of AGC SEIMI CHEMICAL Co., Ltd., an oligomer having a perfluoroalkyl structure having 5 carbon atoms (an oligomer having 30 repeating monomer units having the perfluoroalkyl structure having 5 carbon atoms)
- FTERGENT 601ADH: a product of NEOS Company Limited, an oligomer having a perfluoroalkyl structure having 5 carbon atoms (an oligomer having 200 repeating monomer units having the perfluoroalkyl structure having 5 carbon atoms
- KP126: a product of Shin-Etsu Chemical Co., Ltd., an oligomer having a silicone structure having a methyl group (number of siloxane repeating units: 500)
- KP109: a product of Shin-Etsu Chemical Co., Ltd., an oligomer having a silicone structure having a methyl group (number of siloxane repeating units: 500)
- OGSOL SI 10-10: a product of Osaka Gas Chemicals Co., Ltd., an oligomer having a silane structure having a methyl group and a phenyl group (number of silane repeating units: 10)
- FC4430: a product of 3M, an oligomer having a perfluoroalkyl structure having 4 carbon atoms (an oligomer having 10 repeating monomer units having the perfluoroalkyl structure having 4 carbon atoms)
- FC4432: a product of 3M, an oligomer having a perfluoroalkyl structure having 4 carbon atoms (an oligomer having 10 repeating monomer units having the perfluoroalkyl structure having 4 carbon atoms)
- SURFLON® S-656: a product of AGC SEIMI CHEMICAL Co., Ltd., an oligomer having a perfluoroalkyl structure having 5 carbon atoms (an oligomer having 30 repeating monomer units having the perfluoroalkyl structure having 5 carbon atoms)

In Tables 1-1 and 1-2, the number of carbon atoms in the "Surfactant" column represents the number of carbon atoms in the "perfluoroalkyl structure," the substituents (methyl groups) in siloxane, or the substituents (phenyl groups) in silane contained in each surfactant.

[Evaluation of Properties of Endless Belts]

For each of the endless belts obtained in the Examples, the following properties are determined by the methods described above. The results are shown in Tables 1-1 and 1-2.

- The discharge starting voltage of the layer containing the resin and the electrically conductive particles (for a layered belt having a plurality of layers, the above layer is the surface layer) (hereinafter referred to as the "discharge starting voltage").
- Potential decay rate (V/msec).
- Blowing pressure P0 (the blowing pressure of air at which, when the air is blown onto the outer circumferential surface of the endless belt from the upper side thereof while the blowing pressure is increased after polyester resin particles with a volume average particle diameter of 4.7 μm have been caused to adhere to the outer circumferential surface at a load of 0 g/$cm^2$, all the polyester resin particles adhering to the outer circumferential surface are separated from the outer circumferential surface).

Blowing pressure P46 (the blowing pressure of air at which, when the air is blown onto the outer circumferential surface of the endless belt from the upper side thereof while the blowing pressure is increased after polyester resin particles with a volume average particle diameter of 4.7 μm have been caused to adhere to the outer circumferential surface at a load of 46 g/cm$^2$, all the polyester resin particles adhering to the outer circumferential surface are separated from the outer circumferential surface).

Surface free energy (mN/m) of the outer circumferential surface of the endless belt.

Water contact angle)(° of the outer circumferential surface of the endless belt.

Diiodomethane contact angle)(° of the outer circumferential surface of the endless belt.

The layer structure of each endless belt, the type of resin contained in the first layer, the number average primary particle diameter of the electrically conductive particles contained in the first layer, the content of the surfactant with respect to the total mass of solids in the first layer, the type of surfactant, and the number of carbon atoms in the surfactant are also shown in Tables 1-1 and 1-2.

[Evaluation of Endless Belts (1)]

<Evaluation of Transferability onto Non-Smooth Paper Sheet (11)>

One of the endless belts obtained in the Examples is installed as the intermediate transfer belt in "an apparatus obtained by modifying DocuColor-7171P (i.e., a modified apparatus obtained by attaching the intermediate transfer belt and adjusting a cleaning blade according to the thickness of the belt)." Then a blue solid image is formed on a non-smooth paper sheet (LEATHAC 66, 204 gsm) in an environment at a temperature of 22° C. and a humidity of 10% RH under the condition of a recording medium conveying speed of 366 mm/s in the second transfer region, and white patches in recessed portions are visually evaluated. The evaluation criteria are shown below, and the results are shown in Tables 1-1 and 1-2. In this evaluation, the temperature and humidity environment is set as described above, so that the transferability onto a non-smooth paper sheet that is specific to electrostatic adhesion is evaluated.

The first transfer roller used is an electrically conductive roller (1) described below.

The contact width between the intermediate transfer belt and the second transfer roller (that is denoted simply as "Contact width" in the tables) is set to a width shown in Tables 1-1 and 1-2.

The toner used has a volume average particle diameter of 4.7 μm.

—Evaluation Criteria—

A: No white patches occur.

B: Slight color changes occur.

B−: Although no distinct color changes occur, the degree of color changes is larger than that in B.

C: Distinct color changes occur.

D: White patches occur.

<Evaluation of Transferability onto Non-Smooth Paper Sheet (12)>

For each of the endless belts, its transferability onto a non-smooth paper sheet is evaluated in the same manner as in the transferability evaluation (11) except that the conveyance speed of the recording medium in the second transfer region is changed to 524 mm/s.

<Production of Electrically Conductive Roller (1)>

| | |
|---|---|
| Epichlorohydrin-allyl glycidyl ether binary copolymer (ECO) (product name: GECHRON manufactured by ZEON CORPORATION) | 40 parts by mass |
| Acrylonitrile-butadiene rubber (NBR) (product name: Nipol DN223 manufactured by ZEON CORPORATION) | 60 parts by mass |
| Foaming agent (benzenesulfonyl hydrazide) | 6 parts by mass |
| Vulcanizing agent (product name: sulfur 200 mesh manufactured by Tsurumi Chemical Industry Co., ltd.) | 1 part by mass |
| Vulcanizing accelerator (product name: NOCCELER M manufactured by OUCHI SHINKO CHEMICAL INDUSTRIAL CO., LTD. | 1.5 parts by mass |

A rubber composition containing the above components is kneaded using an open roll mill. The kneaded rubber composition is extruded into a shape with a central hole (a donut shape) to form a hollow cylindrical roller. Then the hollow cylindrical roller is heated to 160° C. for 20 minutes to vulcanize and foam the composition, and the electrically conductive roller (1) is thereby obtained.

TABLE 1-1-1

| | Layer structure | Resin | Primary particle diameter of electrically conductive particles (nm) | Discharge starting voltage (kV) | Potential decay rate (V/msec) | Blowing pressure P0 (kPa) | Blowing pressure P46 (kPa) | P46/P0 | Surface free energy (mN/m) | Water contact angle (°) | Diiodo-methane contact angle (°) | Contact width (cm) |
|---|---|---|---|---|---|---|---|---|---|---|---|---|
| Example A1 | Layered belt | PI | 9 | 1.38 | 3 | 3 | 3.9 | 1.30 | 26.7 | 102 | 71 | 1.0 |
| Example A2 | Layered belt | PI | 9 | 1.36 | 2.3 | 3 | 3.9 | 1.30 | 26.7 | 102 | 71 | 1.0 |
| Example A3 | Layered belt | PI | 9 | 1.35 | 3.8 | 3 | 3.9 | 1.30 | 26.7 | 102 | 71 | 1.0 |
| Example A4 | Layered belt | PI | 9 | 1.32 | 2.9 | 3 | 3.9 | 1.30 | 26.7 | 102 | 71 | 1.0 |
| Example B1 | Single-layer belt | PI | 9 | 1.25 | 2.9 | 3 | 3.9 | 1.30 | 26.7 | 102 | 71 | 1.0 |
| Example B2 | Single-layer belt | PI | 9 | 1.23 | 4.1 | 3 | 3.9 | 1.30 | 26.7 | 102 | 71 | 1.0 |
| Example B3 | Single-layer belt | PI | 9 | 1.21 | 4.3 | 3 | 3.9 | 1.30 | 26.7 | 102 | 71 | 1.0 |
| Example B4 | Single-layer belt | PI | 9 | 1.19 | 3.8 | 3 | 3.9 | 1.30 | 26.7 | 102 | 71 | 1.0 |
| Example B5 | Single-layer belt | PI | 11 | 0.93 | 3.2 | 3 | 3.9 | 1.30 | 26.7 | 102 | 71 | 1.0 |
| Example B6 | Single-layer belt | PI | 9 | 1.15 | 3.2 | 3 | 3.9 | 1.30 | 26.7 | 102 | 71 | 1.0 |
| Example B7 | Single-layer belt | PI | 9 | 1.17 | 3.4 | 3 | 3.9 | 1.30 | 26.7 | 102 | 71 | 1.0 |

TABLE 1-1-1-continued

| | Layer structure | Resin | Primary particle diameter of electrically conductive particles (nm) | Discharge starting voltage (kV) | Potential decay rate (V/msec) | Blowing pressure P0 (kPa) | Blowing pressure P46 (kPa) | P46/P0 | Surface free energy (mN/m) | Water contact angle (°) | Diiodo-methane contact angle (°) | Contact width (cm) |
|---|---|---|---|---|---|---|---|---|---|---|---|---|
| Example B8 | Single-layer belt | PI | 9 | 1.18 | 3.6 | 3 | 3.9 | 1.30 | 26.7 | 102 | 71 | 1.0 |
| Example B9 | Single-layer belt | PI | 8 | 1.43 | 3.0 | 2.8 | 3.64 | 1.30 | 26.7 | 102 | 71 | 1.0 |
| Example C1 | Single-layer belt | PAI | 9 | 1.01 | 5.2 | 3.4 | 4.93 | 1.45 | 27 | 98 | 69 | 1.0 |
| Example C2 | Single-layer belt | PAI | 9 | 0.99 | 5.3 | 3.4 | 4.93 | 1.45 | 27 | 98 | 69 | 1.0 |
| Example C3 | Single-layer belt | PAI | 9 | 0.97 | 5.5 | 3.4 | 4.93 | 1.45 | 27 | 98 | 69 | 1.0 |
| Example D1 | Single-layer belt | PEEK | 9 | 0.98 | 2.9 | 4.1 | 5.822 | 1.42 | 30 | 95 | 66 | 1.0 |
| Example E1 | Single-layer belt | PPS | 9 | 0.99 | 3.4 | 5 | 7 | 1.40 | 32 | 93 | 64 | 1.0 |
| Example F1 | Single-layer belt | PI | 9 | 1.48 | 1.9 | 3 | 4.2 | 1.40 | 26.7 | 102 | 71 | 1.0 |
| Example F2 | Single-layer belt | PI | 9 | 1.53 | 2.1 | 3 | 4.2 | 1.40 | 26.7 | 102 | 71 | 1.0 |
| Example F3 | Single-layer belt | PI | 9 | 1.51 | 2.2 | 3 | 4.2 | 1.40 | 26.7 | 102 | 71 | 1.0 |

TABLE 1-1-2

| | Surfactant | | | | |
|---|---|---|---|---|---|
| | Type | % by mass | Number of carbon atoms | Transferability evaluation 11 | Transferability evaluation 12 |
| Example A1 | SURFLON S-431 | 5 | 5 | A | A |
| Example A2 | SURFLON S-431 | 5 | 5 | A | A |
| Example A3 | SURFLON S-431 | 5 | 5 | A | A |
| Example A4 | SURFLON S-431 | 5 | 5 | A | A |
| Example B1 | SURFLON S-431 | 5 | 5 | A | A |
| Example B2 | SURFLON S-431 | 5 | 5 | A | A |
| Example B3 | SURFLON S-431 | 5 | 5 | A | A |
| Example B4 | SURFLON S-431 | 5 | 5 | A | A |
| Example B5 | SURFLON S-431 | 5 | 5 | A | B |
| Example B6 | SURFLON S-431 | 5 | 5 | A | A |
| Example B7 | SURFLON S-431 | 5 | 5 | A | A |
| Example B8 | SURFLON S-431 | 5 | 5 | A | A |
| Example B9 | SURFLON S-431 | 5 | 5 | A | A |
| Example C1 | SURFLON S-431 | 5 | 5 | A | B |
| Example C2 | SURFLON S-431 | 5 | 5 | A | B |
| Example C3 | SURFLON S-431 | 5 | 5 | A | B |
| Example D1 | SURFLON S-431 | 5 | 5 | A | B |
| Example E1 | SURFLON S-431 | 5 | 5 | A | B |
| Example F1 | SURFLON S-431 | 5 | 5 | B | B |
| Example F2 | SURFLON S-431 | 5 | 5 | B | B |
| Example F3 | SURFLON S-431 | 5 | 5 | B | B |

TABLE 1-2

| | Base Example | Primary particle diameter of electrically conductive particles (nm) | Discharge starting voltage (kV) | Potential decay rate (V/msec) | Blowing pressure P0 (kPa) | Blowing pressure P46 (kPa) | P46/P0 | Surface free energy (mN/m) |
|---|---|---|---|---|---|---|---|---|
| Example G1 | B1 | 9 | 1.25 | 3.0 | 2.1 | 3 | 1.43 | 48 |
| Example G2 | B1 | 9 | 1.25 | 3.0 | 2.1 | 3 | 1.43 | 44 |
| Example G3 | B1 | 9 | 1.25 | 3.0 | 5.3 | 7.3 | 1.38 | 48 |

TABLE 1-2-continued

| | | | | | | | | |
|---|---|---|---|---|---|---|---|---|
| Example G4 | B1 | 9 | 1.25 | 3.0 | 4.6 | 6.5 | 1.41 | 39 |
| Example G5 | B1 | 9 | 1.25 | 3.0 | 2.4 | 3.3 | 1.38 | 46 |
| Example G6 | B1 | 9 | 1.25 | 3.0 | 4.2 | 5.8 | 1.38 | 39 |
| Example G7 | B1 | 9 | 1.25 | 3.0 | 2.1 | 2.9 | 1.38 | 35 |
| Example G8 | B1 | 9 | 1.25 | 3.0 | 6 | 8 | 1.33 | 42 |
| Example G9 | B1 | 9 | 1.25 | 3.6 | 2.1 | 3 | 1.43 | 44 |
| Example G10 | C1 | 9 | 1.01 | 5.2 | 2.9 | 4.1 | 1.41 | 44 |
| Example G11 | D1 | 9 | 0.98 | 2.9 | 4 | 5.8 | 1.45 | 44 |
| Example G12 | E1 | 9 | 0.99 | 3.4 | 5.2 | 7.5 | 1.44 | 44 |
| Example G13 | B1 | 9 | 1.25 | 3.0 | 5 | 8 | 1.60 | 44 |
| Comparative Example H1 | B1 | 13 | 0.74 | 3.4 | 7.2 | 11.5 | 1.60 | 51 |
| Comparative Example H2 | B1 | 13 | 0.74 | 2.3 | 9.6 | 15.4 | 1.60 | 55 |

| | Water contact angle (°) | Diiodo-methane contact angle (°) | Contact width (cm) | Surfactant Type | Surfactant % by mass | Surfactant Number of carbon atoms | Transferability evaluation 11 | Transferability evaluation 12 |
|---|---|---|---|---|---|---|---|---|
| Example G1 | 95 | 41 | 1.0 | FTERGENT 601ADH | 5 | 5 | A | A |
| Example G2 | 84 | 43 | 1.0 | KP126 | 5 | 1 | A | A |
| Example G3 | 92 | 37 | 1.0 | FTERGENT 601ADH | 2.5 | 5 | B | B |
| Example G4 | 95 | 51 | 1.0 | KP109 | 2.5 | 1 | B | B |
| Example G5 | 90 | 36 | 1.0 | OGSOL SI 10-10 | 5.3 | 6 | B | B |
| Example G6 | 96 | 45 | 1.0 | FC4430 | 5 | 4 | A | A |
| Example G7 | 105 | 49 | 1.0 | FC4432 | 5 | 4 | A | A |
| Example G8 | 90 | 44 | 1.0 | SURFLON S-656 | 5 | 5 | B | B |
| Example G9 | 84 | 43 | 1.0 | KP126 | 5 | 1 | A | A |
| Example G10 | 84 | 43 | 1.0 | KP126 | 5 | 1 | A | A |
| Example G11 | 84 | 43 | 1.0 | KP126 | 5 | 1 | B | B |
| Example G12 | 84 | 43 | 1.0 | KP126 | 5 | 1 | B | B |
| Example G13 | 84 | 43 | 1.0 | KP126 | 0.8 | 1 | B | B |
| Comparative Example H1 | 85 | 35 | 1.0 | FTERGENT 601ADH | 0.5 | 5 | C | C |
| Comparative Example H2 | 75 | 29 | 1.0 | None | — | — | D | D |

As can be seen from the above results, the transferability onto a non-smooth paper sheet in each Example is better than that in each Comparative Example.

[Evaluation of Endless Belts (2)]

For each of the endless belts shown in Table 2, the relation between the transferability and the contact width between the intermediate transfer belt and the second transfer member is evaluated. Specifically, the evaluation is performed as follows.

<Evaluation of Transferability onto Non-Smooth Paper Sheet (21)>

One of the endless belts obtained in the Examples is installed as the intermediate transfer belt in "an apparatus obtained by modifying DocuColor-7171P (i.e., a modified apparatus obtained by attaching the intermediate transfer belt and adjusting a cleaning blade according to the thickness of the belt)."

This modified apparatus includes a second transfer roller as the second transfer member.

The contact width between the intermediate transfer belt and the second transfer roller is set to a width shown in Table 2. A blue solid image is formed on a non-smooth paper sheet (LEATHAC 66, 204 gsm) in an environment at a temperature of 22° C. and a humidity of 10% RH under the condition of a recording medium conveyance speed of 366 mm/s in the second transfer region, and white patches in recessed portions are visually evaluated. The evaluation criteria are the same as those in the transferability evaluation (1), and the results are shown in Table 2. In this evaluation, the temperature and humidity environment is set as described above, so that the transferability onto a non-smooth paper sheet that is specific to electrostatic adhesion is evaluated.

The first transfer roller used is the electrically conductive roller (1) described above.

The toner used has a volume average particle diameter of 4.7 μm.

<Evaluation of Transferability onto Non-Smooth Paper Sheet (22)>

One of the endless belts shown in Table 2 is installed as the intermediate transfer belt in "an apparatus obtained by modifying DocuColor-7171P (i.e., a modified apparatus obtained by attaching a second transfer unit including a second transfer belt and the intermediate transfer belt and adjusting a cleaning blade according to the thickness of the belt)."

This modified apparatus includes the second transfer belt as the second transfer member.

The contact width between the intermediate transfer belt and the second transfer belt is set to a width shown in Table 2. A blue solid image is formed on a non-smooth paper sheet (LEATHAC 66, 204 gsm) in an environment at a temperature of 22° C. and a humidity of 10% RH under the condition of a recording medium conveyance speed of 366 mm/s in the second transfer region, and white patches in recessed portions are visually evaluated. The evaluation criteria are the same as those in the transferability evaluation (1), and the results are shown in Table 2. In this evaluation, the temperature and humidity environment is set as described above, so that the transferability onto a non-smooth paper sheet that is specific to electrostatic adhesion is evaluated.

The first transfer roller used is the electrically conductive roller (1) described above.

The toner used has a volume average particle diameter of 4.7 μm.

TABLE 2

| | Transferability evaluation 2 | | | | | | | | | |
|---|---|---|---|---|---|---|---|---|---|---|
| | Evaluation 21 (second transfer roller) Contact width between intermediate transfer belt and second transfer roller | | | | | Evaluation 22 (second transfer belt) Contact width between intermediate transfer belt and second transfer belt | | | | |
| | 0.1 cm | 0.5 cm | 1.0 cm | 2.5 cm | 3 cm | 0.1 cm | 0.5 cm | 1.0 cm | 3.5 cm | 4.0 cm |
| Example A1 | B– | B | A | B | B– | B– | B | A | B | B– |
| Example A2 | B– | B | A | B | B– | B– | B | A | B | B– |
| Example A3 | B– | B | A | B | B– | B– | B | A | B | B– |
| Example A4 | B– | B | A | B | B– | B– | B | A | B | B– |
| Example B1 | B– | B | A | B | B– | B– | B | A | B | B– |
| Example B2 | B– | B | A | B | B– | B– | B | A | B | B– |
| Example B3 | B– | B | A | B | B– | B– | B | A | B | B– |
| Example B4 | B– | B | A | B | B– | B– | B | A | B | B– |
| Example B5 | B– | B | A | B | B– | B– | B | A | B | B– |
| Example B6 | B– | B | A | B | B– | B– | B | A | B | B– |
| Example B7 | B– | B | A | B | B– | B– | B | A | B | B– |
| Example B8 | B– | B | A | B | B– | B– | B | A | B | B– |
| Example C1 | B– | B | A | B | B– | B– | B | A | B | B– |
| Example C2 | B– | B | A | B | B– | B– | B | A | B | B– |
| Example C3 | B– | B | A | B | B– | B– | B | A | B | B– |
| Example D1 | B– | B | A | B | B– | B– | B | A | B | B– |
| Example E1 | B– | B | A | B | B– | B– | B | A | B | B– |
| Example F1 | C | B– | B | B– | C | C | B– | B | B– | C |
| Example F2 | C | B– | B | B– | C | C | B– | B | B– | C |
| Example F3 | C | B– | B | B– | C | C | B– | B | B– | C |
| Example G1 | B– | B | A | B | B– | B– | B | A | B | B– |
| Example G2 | B– | B | A | B | B– | B– | B | A | B | B– |
| Example G3 | C | B– | B | B– | C | C | B– | B | B– | C |
| Example G4 | C | B– | B | B– | C | C | B– | B | B– | C |
| Example G5 | C | B– | B | B– | C | C | B– | B | B– | C |
| Example G6 | B– | B | A | B | B– | B– | B | A | B | B– |
| Example G7 | B– | B | A | B | B– | B– | B | A | B | B– |
| Example G8 | C | B– | B | B– | C | C | B– | B | B– | C |
| Example G9 | B– | B | A | B | B– | B– | B | A | B | B– |
| Example G10 | B– | B | A | B | B– | B– | B | A | B | B– |
| Example G11 | C | B– | B | B– | C | C | B– | B | B– | C |
| Example G12 | C | B– | B | B– | C | C | B– | B | B– | C |
| Example G13 | B– | B | A | B | B– | B– | B | A | B | B– |
| Comparative Example H1 | D | C– | C | C– | D | D | C– | C | C– | D |
| Comparative Example H2 | D | C– | C | C– | D | D | C– | C | C– | D |
| Comparative Example H3 | D | C– | C | C– | D | D | C– | C | C– | D |

As can be seen from the above results, the transferability onto a non-smooth paper sheet is better in each Example than in each Comparative Example even when the contact angle between the intermediate transfer belt and the second transfer member is large.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An endless belt comprising:

a layer comprising:

a resin; and electrically conductive particles, wherein the layer is configured with an electrostatic adhesion characteristic wherein a discharge starting voltage, at which discharge starts when a voltage is applied to the layer and increased, is 0.9 kV or more, and wherein the layer is configured to exhibit a discharge starting voltage of 0.9 kV or more in an environment of 22° C. and 15% humidity.

2. The endless belt according to claim 1, wherein the electrically conductive particles have a number average primary particle diameter of 11 nm or less.

3. The endless belt according to claim 2, wherein the number average primary particle diameter of the electrically conductive particles is from 8 nm to 10 nm inclusive.

4. The endless belt according to claim 1, wherein the electrically conductive particles have a number average primary particle diameter of 11 nm or less.

5. The endless belt according to claim 1, wherein the electrically conductive particles include electrically conductive carbon particles.

6. The endless belt according to claim 1, wherein a content of the electrically conductive particles is from 10% by mass to 30% by mass inclusive with respect to a total mass of solids in the layer.

7. The endless belt according to claim 1, wherein the layer is configured such that, when polyester resin particles with a volume average particle diameter of 4.7 μm are caused to adhere to an outer circumferential surface of the endless belt at a load of 0 $g/cm^2$ and then air is blown onto the outer circumferential surface from an upper side of the outer circumferential surface while the blowing pressure of the air is increased, all the polyester resin particles adhering to the outer circumferential surface are separated from the outer circumferential surface before the blowing pressure exceeds 6 kPa.

8. The endless belt according to claim 7, wherein a relation between the blowing pressure of the air at which, when the polyester resin particles are caused to adhere to the outer circumferential surface at a load of 0 $g/cm^2$ and then the air is blown onto to the outer circumferential surface from the upper side thereof while the blowing pressure is increased, all the polyester resin particles are separated from the outer circumferential surface and the blowing pressure of the air at which, when the polyester resin particles are caused to adhere to the outer circumferential surface at a load of 46 $g/cm^2$ and then the air is blown onto the outer circumferential surface from the upper side thereof while the blowing pressure is increased, all the polyester resin particles are separated from the outer circumferential surface satisfies a relation represented by the following formula (P):

$$\text{blowing pressure } P46/\text{blowing pressure } P0 \leq 1.5, \qquad \text{formula (P):}$$

wherein, in formula (P), P0 is the blowing pressure of the air at which all the polyester resin particles caused to adhere to the outer circumferential surface at a load of 0 $g/cm^2$ are separated from the outer circumferential surface, and P46 is the blowing pressure of the air at which all the polyester resin particles caused to adhere to the outer circumferential surface at a load of 46 $g/cm^2$ are separated from the outer circumferential surface.

9. The endless belt according to claim 1, wherein the layer further comprises a surfactant.

10. The endless belt according to claim 9, wherein the content of the surfactant is from 1% by mass to 6% by mass inclusive with respect to the total mass of solids in the layer.

11. The endless belt according to claim 9, wherein the surfactant is at least one oligomer selected from an oligomer having a substituent having 6 or less carbon atoms and a fluorine atom and an oligomer having a silicone structure having a methyl group.

12. The endless belt according to claim 11, wherein the oligomer having a substituent having 6 or less carbon atoms and a fluorine atom is an oligomer having a perfluoroalkyl structure having 6 or less carbon atoms.

13. The endless belt according to claim 11, wherein the number of repeating monomer units in the at least one oligomer is 4 or more.

14. The endless belt according to claim 1, wherein the endless belt has an outer circumferential surface having a surface free energy of 47 mN/m or less.

15. The endless belt according to claim 1, wherein the endless belt has an outer circumferential surface having a water contact angle of 85° or more.

16. The endless belt according to claim 1, wherein the endless belt has an outer circumferential surface having a diiodomethane contact angle of 40° or more.

17. A transfer device comprising:

an intermediate transfer body having an outer circumferential surface onto which a toner image may be transferred, the intermediate transfer body including the endless belt according to claim 1;

a first transfer unit including a first transfer member configured to first-transfer a toner image formed on a surface of an image holding member onto the outer circumferential surface of the intermediate transfer body; and a second transfer unit including a second transfer member that contacts the outer circumferential surface of the intermediate transfer body and is configured to second-transfer the toner image transferred onto the outer circumferential surface of the intermediate transfer body onto a surface of a recording medium.

18. The transfer device according to claim 17, wherein the second transfer member comprises a second transfer roller, and wherein a contact width between the intermediate transfer body and the second transfer roller is from 0.2 cm to 4.0 cm inclusive.

19. The transfer device according to claim 18, wherein the contact width between the intermediate transfer body and the second transfer roller is from 0.2 cm to 2.8 cm inclusive.

20. An image forming apparatus comprising:

a toner image forming device that includes an image holding member and is configured to form a toner image on a surface of the image holding member; and a transfer device configured to transfer the toner image formed on the surface of the image holding member onto a surface of a recording medium, the transfer device comprising the transfer device according to claim 17.

* * * * *